(12) United States Patent
Iwai et al.

(10) Patent No.: US 11,336,501 B2
(45) Date of Patent: May 17, 2022

(54) SIGNAL GENERATION APPARATUS AND SIGNAL GENERATION METHOD

(71) Applicant: ANRITSU CORPORATION, Kanagawa (JP)

(72) Inventors: Tatsuya Iwai, Kanagawa (JP); Tomoaki Kabasawa, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/122,203

(22) Filed: Dec. 15, 2020

(65) Prior Publication Data
US 2021/0273840 A1  Sep. 2, 2021

(30) Foreign Application Priority Data

Dec. 20, 2019  (JP) .............................. JP2019-230134
Dec. 3, 2020  (JP) .............................. JP2020-200715

(51) Int. Cl.
*H04L 27/32* (2006.01)
*H04B 17/309* (2015.01)

(52) U.S. Cl.
CPC .......... *H04L 27/32* (2013.01); *H04B 17/309* (2015.01)

(58) Field of Classification Search
CPC ... H04L 27/32; H04L 27/3472; H04B 17/309; H03K 7/02
See application file for complete search history.

(56) References Cited

U.S. PATENT DOCUMENTS

| | | | | |
|---|---|---|---|---|
| 5,969,579 A | * | 10/1999 | Hartke | ..................... H03K 7/02 326/126 |
| 8,983,291 B1 | * | 3/2015 | Broekaert | ............ H04B 10/524 398/43 |
| 2005/0264333 A1 | * | 12/2005 | Staszewski | ........... H03F 3/2176 327/172 |
| 2017/0302406 A1 | | 10/2017 | Tanaka et al. | |
| 2020/0333871 A1 | * | 10/2020 | Brox | ..................... G11C 7/1057 |
| 2021/0273831 A1 | * | 9/2021 | Lin | .................. G11C 29/50012 |

FOREIGN PATENT DOCUMENTS

WO    2016-110973 A    7/2016

* cited by examiner

*Primary Examiner* — Qutbuddin Ghulamali
(74) *Attorney, Agent, or Firm* — Pearne & Gordon LLP

(57) ABSTRACT

[Task] There is provided a signal generation apparatus and a signal generation method capable of performing mutual switching between a PAM N signal having n values and a PAM M signal having m values (m<n) without generating a noise or an overvoltage.
[Means for Resolution] There are provided a PAM N generation circuit 41 that generates a PAM N signal of n values, a PAM M generation circuit 42 that generates a PAM M signal of m values (m<n) having a maximum voltage level equal to a maximum voltage level of the PAM N signal generated by the PAM N generation circuit 41, and a selector 43 that outputs any one of the PAM N signal generated by the PAM N generation circuit 41 and the PAM M signal generated by the PAM M generation circuit 42.

7 Claims, 18 Drawing Sheets

|  | SW1 | SW2 | SW3 | Output available-level | Use |
|---|---|---|---|---|---|
| State 1 | ON | OFF | OFF | 0, 2 | PAM2⇔PAM3 Switching |
| State 2 | ON | ON | OFF | 0, 1, 2, 3 | PAM2⇔PAM4 Switching |
| State 3 | OFF | OFF | ON | 0, 4 | PAM2⇔PAM5 Switching |
| State 4 | OFF | ON | ON | 0, 1, 4, 5 | PAM2⇔PAM6 Switching<br>PAM4⇔PAM6 Switching |
| State 5 | ON | OFF | ON | 0, 2, 4, 6 | PAM2⇔PAM7 Switching<br>PAM4⇔PAM7 Switching |
| State 6 | ON | ON | ON | 0, 1, 2, 3, 4, 5, 6, 7 | PAM2 to PAM8 Output<br>PAM4⇔PAM8 Switching |
| State 7 | OFF | OFF | OFF | 0 | Not used |
| State 8 | OFF | ON | OFF | 0, 1 | Not used |
| Output available-level | 0, 2 | 0, 1 | 0, 4 | | |

FIG. 9

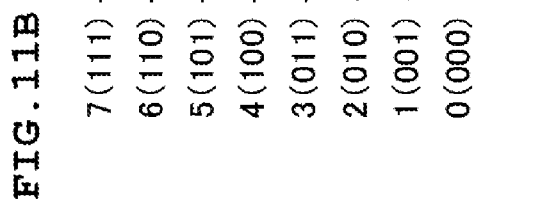
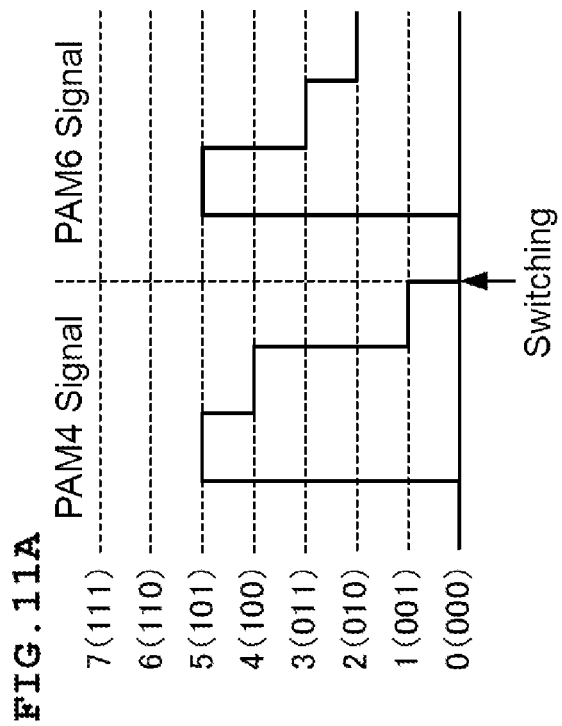
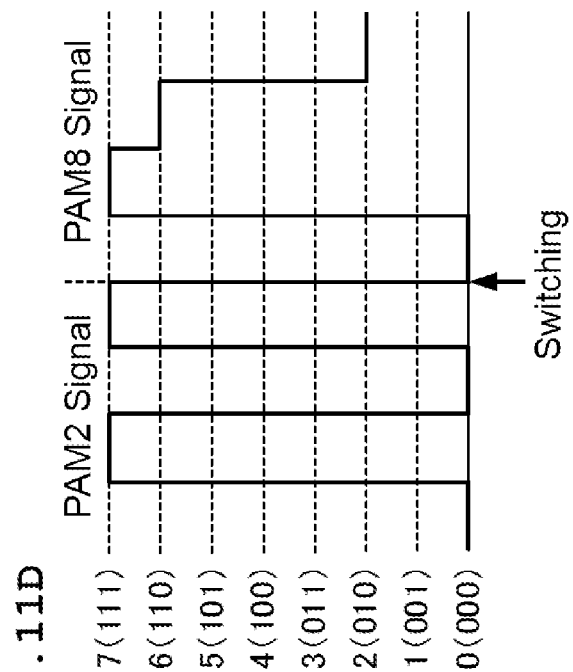
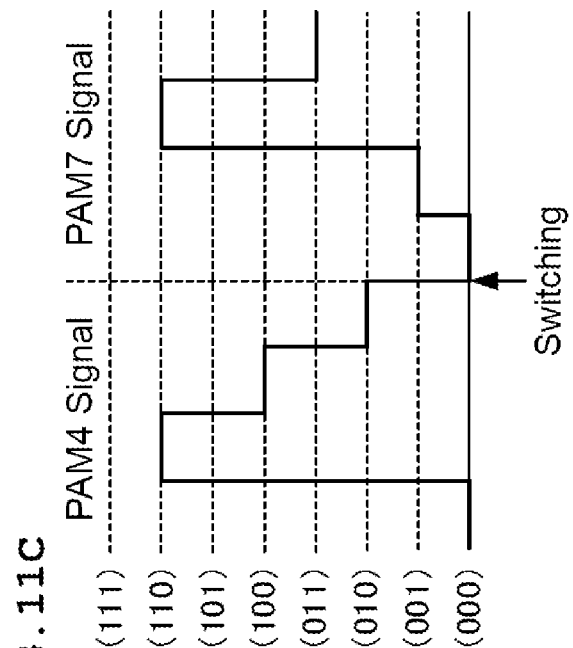
FIG. 11A
FIG. 11B
FIG. 11C
FIG. 11D

SIGNAL GENERATION APPARATUS AND SIGNAL GENERATION METHOD

TECHNICAL FIELD

The present invention relates to a signal generation apparatus and a signal generation method, and more particularly to a signal generation apparatus and a signal generation method for generating a test signal for measuring an error rate of a communication apparatus which uses pulse amplitude modulation 2 (PAM2) transmission or pulse amplitude modulation 3 (PAM3) transmission.

BACKGROUND ART

In recent years, a communication system has been increased in speed, and various communication apparatuses constituting the communication system have been improved in performance. A bit error rate defined as a comparison between the number of generated bit errors in received data and the total number of pieces of the received data is known as one of an indicator of signal quality evaluation in these communication apparatuses.

In a standard such as IEEE 100G or 400G, transmission using a pulse amplitude modulation 4 (PAM4) signal is defined instead of transmission using a PAM2 (non return to zero (NRZ)) signal so as to respond to an extremely high bit rate. Since the PAM4 signal realizes four values with one symbol, the transmission amount can be doubled as compared with the PAM2 signal, while a signal to noise ratio (SNR) cannot be obtained as compared with the PAM2 signal since an eye-opening of the PAM4 signal is small. Therefore, a PAM3 signal, which is intermediate between the two, is considered. In the PAM3 signal, realizing three values with one symbol reduces the transmission amount for one symbol by 3/4 times as compared with the PAM4 signal, but the SNR is theoretically improved by approximately 3.5 dB.

Accordingly, it possible to increase a transmission rate while maintaining the signal quality.

As illustrated in FIG. 17, a signal generation apparatus 30 for measuring an error rate in the related art uses a pseudo-random ternary sequence (PRTS) generation circuit 31 according to a PRTS generation polynomial to generate a PAM3 signal with PAM3 symbols having three values of 0 (00), 1 (01), and 2 (10). Further, the signal generation apparatus 30 causes an adder 33 to add a most significant bit (MSB) signal and a least significant bit (LSB) signal generated by two NRZ generation circuits 32a and 32b according to a pseudo-random bit sequence (PRBS) generation polynomial and generates a PAM2 signal with PAM2 symbols having two values of 0 (00) and 3 (11). That is, the two NRZ generation circuits 32a and 32b realize an NRZ output by outputting the same signal as the MSB and the LSB in a manner of generating the PAM4 signal.

In recent years, in error rate measurement, there is a demand to seamlessly switch a PAM2 signal and a PAM3 signal to measure whether or not a communication apparatus as a device under test (DUT) performs a desired operation. However, as illustrated in FIG. 18, a maximum voltage level of the PAM2 signal obtained by adding the outputs of the two NRZ generation circuits 32a and 32b is equal to a maximum voltage level of the PAM4 signal, and becomes approximately 1.5 times a maximum voltage level of the PAM3 signal output from the PRTS generation circuit 31. Therefore, when the PAM2 signal and the PAM3 signal are mutually switched by a selector 34, an apparatus on a reception side may be adversely affected. Therefore, it is conceivable to adjust voltages of the NRZ generation circuits 32a and 32b with a control signal from a control unit 35 configured with a central processing unit (CPU). However, even if the maximum voltage level of the PAM2 signal is made to match the maximum voltage level of the PAM3 signal by this method, since a processing speed of the CPU is slow, there is a problem in that the processing speed is not in time for switching signals and a noise or an overvoltage occurs.

Meanwhile, there is proposed a transmission apparatus which controls a transmission rate of a PAM2 signal or a PAM4 signal according to a rate instruction given from a CPU (for example, refer to Patent Document 1).

RELATED ART DOCUMENT

[Patent Document]
[Patent Document 1] International Publication No. WO2016/110973

DISCLOSURE OF THE INVENTION

Problem that the Invention is to Solve

However, the apparatus disclosed in Patent Document 1 can perform the rate control on the PAM2 signal or the PAM4 signal, but when the PAM2 signal and the PAM4 signal are switched, there is a problem that a processing speed of the CPU is not in time and the correct rate control cannot be performed. That is, the apparatus disclosed in Patent Document 1 cannot solve the problem caused by the slow processing speed of the CPU when the signals of different transmission systems are mutually switched.

The present invention is made to solve such problems in the related art, and to provide a signal generation apparatus and a signal generation method capable of performing mutual switching of a pulse amplitude modulation N (PAM N) signal having n values and a pulse amplitude modulation M (PAM M) signal having m values (m<n) without generating a noise or an overvoltage.

Means for Solving the Problem

According to the present invention for solving the above problems, there is provided a signal generation apparatus including: a pulse amplitude modulation N (PAM N) generation circuit that generates a PAM N signal of n values; a pulse amplitude modulation M (PAM M) generation circuit that generates a PAM M signal of m values (m<n) having a maximum voltage level equal to a maximum voltage level of the PAM N signal generated by the PAM N generation circuit; and a signal switching unit that outputs any one of the PAM N signal generated by the PAM N generation circuit and the PAM M signal generated by the PAM M generation circuit.

With this configuration, the signal generation apparatus according to the present invention is configured so that the maximum voltage levels of the PAM N signal output from the PAM N generation circuit and the PAM M signal output from the PAM M generation circuit are set to be equal, so that it is not necessary to adjust the voltage when the signal switching unit switches between the PAM N signal and the PAM M signal. Therefore, the signal generation apparatus according to the present invention can perform mutual switching between the PAM N signal and the PAM M signal without generating a noise or an overvoltage due to a slow processing speed of the CPU as compared with the FPGA.

In addition, according to the present invention, the signal generation apparatus may further include: a control unit that outputs a switching control signal for switching an output signal from the signal switching unit from the PAM N signal to the PAM M signal, in which after generating the PAM M signal by using an input of the switching control signal as a trigger, the PAM M generation circuit may output the generated PAM M signal and a PAM M start signal synchronized with a head position of the PAM M signal, and the signal switching unit may continue to output the PAM N signal until the PAM M start signal is input together with the PAM M signal, and output the PAM M signal instead of the PAM N signal by using an input of the PAM M start signal as a trigger.

With this configuration, the signal generation apparatus according to the present invention also continues to output the PAM N signal during a time from a generation start to a generation completion of the PAM M signal, so that the output signal can be switched from the PAM N signal to the PAM M signal without generating a signal output stop section.

In addition, according to the present invention, the signal generation apparatus may further include: a control unit that outputs a switching control signal for switching an output signal from the signal switching unit from the PAM M signal to the PAM N signal, in which after generating the PAM N signal by using an input of the switching control signal as a trigger, the PAM N generation circuit may output the generated PAM N signal and a PAM N start signal synchronized with a head position of the PAM N signal, and the signal switching unit may continue to output the PAM M signal until the PAM N start signal is input together with the PAM N signal, and output the PAM N signal instead of the PAM M signal by using an input of the PAM N start signal as a trigger.

With this configuration, the signal generation apparatus according to the present invention also continues to output the PAM M signal during a time from a generation start to a generation completion of the PAM N signal, so that the output signal can be switched from the PAM M signal to the PAM N signal without generating a signal output stop section.

In addition, according to the present invention, the signal generation apparatus may further include: a precoding circuit that performs precoding on a symbol constituting the PAM N signal or the PAM M signal input from the signal switching unit by using an input of the PAM N start signal or the PAM M start signal as a trigger.

With this configuration, the signal generation apparatus according to the present invention can start the precoding process on the head of the PAM N signal or the PAM M signal, at the same time that the PAM N signal or the PAM M signal is input to the precoding circuit, by using the PAM N start signal or the PAM M start signal synchronized with the head position of the PAM N signal or the PAM M signal as a trigger.

In addition, according to the present invention, the signal generation apparatus may further include: an error insertion circuit that inserts an error into the symbol constituting the PAM N signal or the PAM M signal input from the precoding circuit by using an input of the PAM N start signal or the PAM M start signal as a trigger.

With this configuration, the signal generation apparatus according to the present invention can start the error insertion process on the head of the PAM N signal or the PAM M signal, at the same time that the PAM N signal or the PAM M signal is input to the error insertion circuit, by using the PAM N start signal or the PAM M start signal synchronized with the head position of the PAM N signal or the PAM M signal as a trigger.

Further, in the signal generation apparatus according to the present invention, the PAM M generation circuit may include a first non return to zero (NRZ) generation circuit that generates a first PAM2 signal having two values of 0-level and 2-level, a second NRZ generation circuit that generates a second PAM2 signal having two values of 0-level and 1-level, a third NRZ generation circuit that generates a third PAM2 signal having two values of 0-level and 4-level, a first switch that passes or blocks the first PAM2 signal generated by the first NRZ generation circuit, a second switch that passes or blocks the second PAM2 signal generated by the second NRZ generation circuit, a third switch that passes or blocks the third PAM2 signal generated by the third NRZ generation circuit, a first adder that adds an output signal from the first switch and an output signal from the second switch, and a second adder that adds an output signal from the first adder and an output signal from the third switch to generate the PAM M signal.

With this configuration, since the signal generation apparatus according to the present invention includes the first NRZ generation circuit, the second NRZ generation circuit, and the third NRZ generation circuit, any one of the PAM2 signal, the PAM3 signal, the PAM4 signal, the PAM5 signal, the PAM6 signal, the PAM7 signal, and the PAM8 signal can be generated as the PAM M signal.

Further, according to the present invention, there is provided a signal generation method including: a pulse amplitude modulation N (PAM N) generation step of generating a PAM N signal of n values; a pulse amplitude modulation M (PAM M) generation step of generating a PAM M signal of m values (m<n) having a maximum voltage level equal to a maximum voltage level of the PAM N signal generated in the PAM N generation step; and a signal switching step of outputting any one of the PAM N signal generated in the PAM N generation step and the PAM M signal generated in the PAM M generation step.

With this configuration, the signal generation method according to the present invention is configured so that the maximum voltage levels of the PAM N signal output from the PAM N generation step and the PAM M signal output from the PAM M generation step are set to be equal, so that it is not necessary to adjust the voltage when the PAM N signal and the PAM M signal are switched in the signal switching step. Therefore, the signal generation method according to the present invention can perform mutual switching between the PAM N signal and the PAM M signal without generating a noise or an overvoltage due to a slow processing speed of the CPU as compared with the FPGA.

In addition, according to the present invention, the signal generation method may further include: a switching control step of outputting a switching control signal for switching an output signal from the signal switching step from the PAM N signal to the PAM M signal, in which in the PAM M generation step, after the PAM M signal may be generated by using an input of the switching control signal as a trigger, the generated PAM M signal and a PAM M start signal synchronized with a head position of the PAM M signal may be output; and in the signal switching step, the PAM N signal may be continuously output until the PAM M start signal is input together with the PAM M signal, and the PAM M signal may be output instead of the PAM N signal by using an input of the PAM M start signal as a trigger.

With this configuration, in the signal generation method according to the present invention, the PAM N signal is continuously output during a time from a generation start to a generation completion of the PAM M signal, so that the output signal can be switched from the PAM N signal to the PAM M signal without generating a signal output stop section.

In addition, according to the present invention, the signal generation method may further include: a switching control step of outputting a switching control signal for switching an output signal from the signal switching step from the PAM M signal to the PAM N signal, in which in the PAM N generation step, after the PAM N signal may be generated by using an input of the switching control signal as a trigger, the generated PAM N signal and a PAM N start signal synchronized with a head position of the PAM N signal may be output, and in the signal switching step, the PAM M signal may be continuously output until the PAM N start signal is input together with the PAM N signal, and the PAM N signal may be output instead of the PAM M signal by using an input of the PAM N start signal as a trigger.

With this configuration, in the signal generation method according to the present invention, the PAM M signal is continuously output during a time from a generation start to a generation completion of the PAM N signal, so that the output signal can be switched from the PAM M signal to the PAM N signal without generating a signal output stop section.

Advantage of the Invention

The present invention is to provide a signal generation apparatus and a signal generation method capable of performing mutual switching between a PAM N signal having n values and a PAM M signal having m values (m<n) without generating a noise or an overvoltage.

BRIEF DESCRIPTION OF THE DRAWINGS

FIG. 9 is a table illustrating ON and OFF states of a first switch, a second switch, and a third switch in FIG. 7, an output available-level of each state, and a use of each state.

FIG. 11A is a diagram illustrating an output example of the PAM4 signal and the PAM6 signal before and after switching in the state 4 in which only the first switch is OFF, FIG. 11B is a diagram illustrating an output example of the PAM2 signal and a PAM7 signal before and after switching in a state 5 in which only the second switch is OFF, FIG. 11C is a diagram illustrating an output example of the PAM4 signal and the PAM7 signal before and after switching in the state 5 in which only the second switch is OFF, and FIG. 11D is a diagram illustrating an output example of the PAM2 signal and a PAM8 signal before and after switching in a state 6 in which the first switch, the second switch, and the third switch are all ON.

BEST MODE FOR CARRYING OUT THE INVENTION

Hereinafter, embodiments of a signal generation apparatus and a signal generation method according to the present invention will be described with reference to the drawings.

First Embodiment

Figure 1:
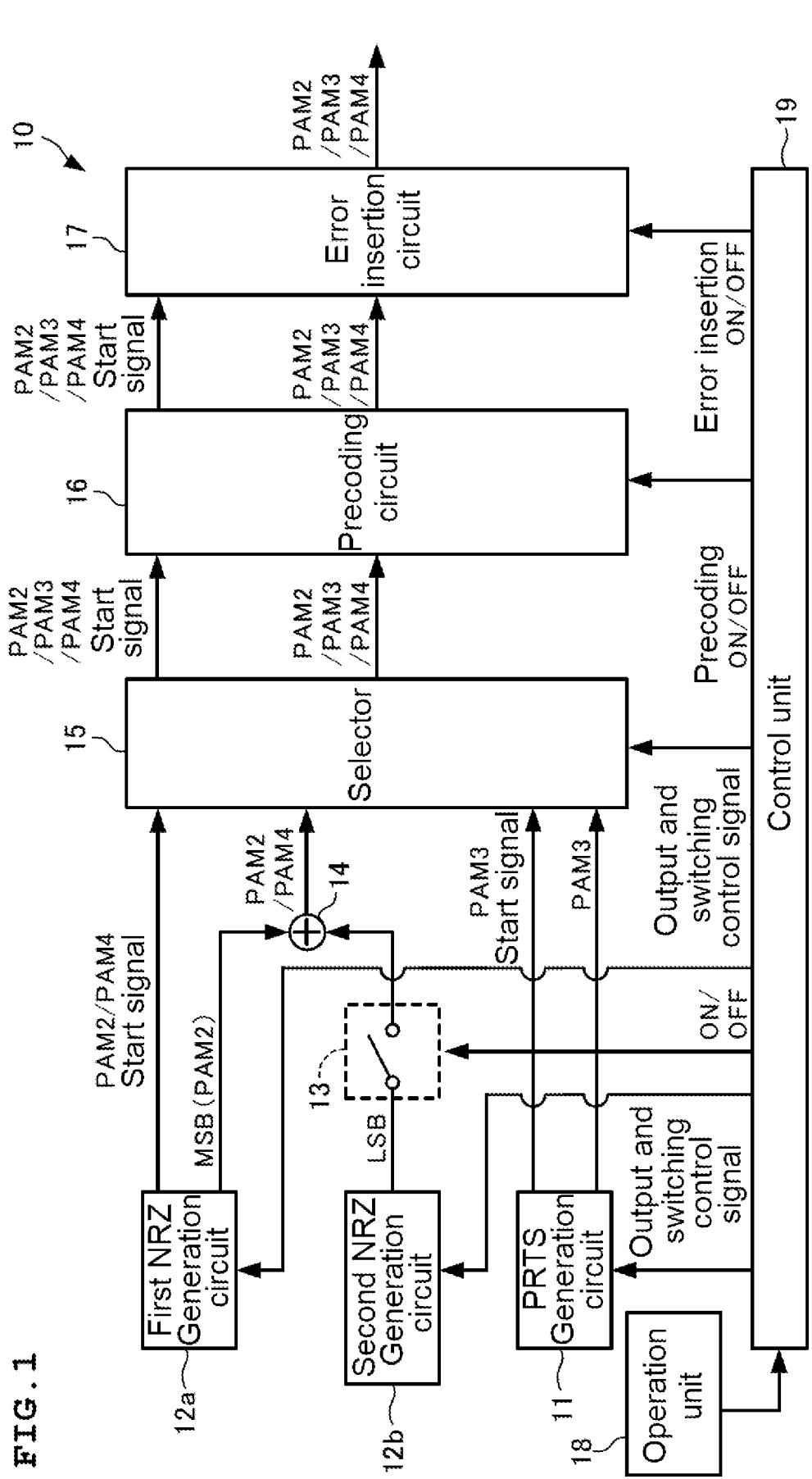
FIG. 1 is a block diagram illustrating a configuration of a signal generation apparatus according to a first embodiment of the present invention.

As illustrated in FIG. 1, a signal generation apparatus according to the present embodiment includes a PRTS generation circuit 11, a first NRZ generation circuit 12a, a second NRZ generation circuit 12b, a switch 13, an adder 14, a selector 15 as a signal switching unit, a precoding circuit 16, the error insertion circuit 17, an operation unit 18, and a control unit 19. The PRTS generation circuit 11, the first NRZ generation circuit 12a, the second NRZ generation circuit 12b, the switch 13, the adder 14, the selector 15, the precoding circuit 16, and the error insertion circuit 17 are configured, for example, on a field programmable gate array (FPGA).

The PRTS generation circuit 11 generates a PAM3 signal with a pseudo-random pattern of PAM3 symbols having three values of 0-level (a low level), 1-level (a middle level), and 2-level (a high level) according to a PRTS generation polynomial. Further, the PRTS generation circuit 11 outputs the generated PAM3 signal and a PAM3 start signal (a PRTS start signal) synchronized with a head position of the PAM3 signal. The PAM3 start signal is transmitted to the selector 15, the precoding circuit 16, and the error insertion circuit 17 in the subsequent stage, together with the PAM3 signal.

The first NRZ generation circuit 12a generates a first PAM2 signal with a pseudo-random pattern of PAM2 symbols having two values of 0-level (a low level) and 2-level (a high level) according to a PRBS generation polynomial. Further, the first NRZ generation circuit 12a outputs the generated first PAM2 signal and a PAM2/PAM4 start signal (an NRZ start signal) synchronized with a head position of the first PAM2 signal. The PAM2/PAM4 start signal is transmitted to the selector 15, the precoding circuit 16, and the error insertion circuit 17 in the subsequent stage, together with the first PAM2 signal.

Further, the second NRZ generation circuit 12b generates a second PAM2 signal with a pseudo-random pattern of PAM2 symbols having two values of 0-level (a low level) and 1-level (a middle level) according to the PRBS generation polynomial. The switch 13 passes or blocks (ON or OFF) the second PAM2 signal generated by the second NRZ generation circuit 12b.

In a case where the switch 13 passes the second PAM2 signal, the adder 14 adds the second PAM2 signal and the first PAM2 signal generated by the first NRZ generation circuit 12a to generate a PAM4 signal having a pseudo-random pattern. At this time, the first PAM2 signal and the second PAM2 signal are respectively MSB and LSB signals constituting the PAM4 signal. On the other hand, in a case where the switch 13 blocks the second PAM2 signal, the adder 14 outputs the first PAM2 signal generated by the first NRZ generation circuit 12a as it is.

The selector 15 outputs any one of the output signal from the adder 14 and the PAM3 signal generated by the PRTS generation circuit 11, according to an operation input to the operation unit 18 by a user. Here, the output signal from the adder 14 is the first PAM2 signal or the PAM4 signal described above.

Figure 2:
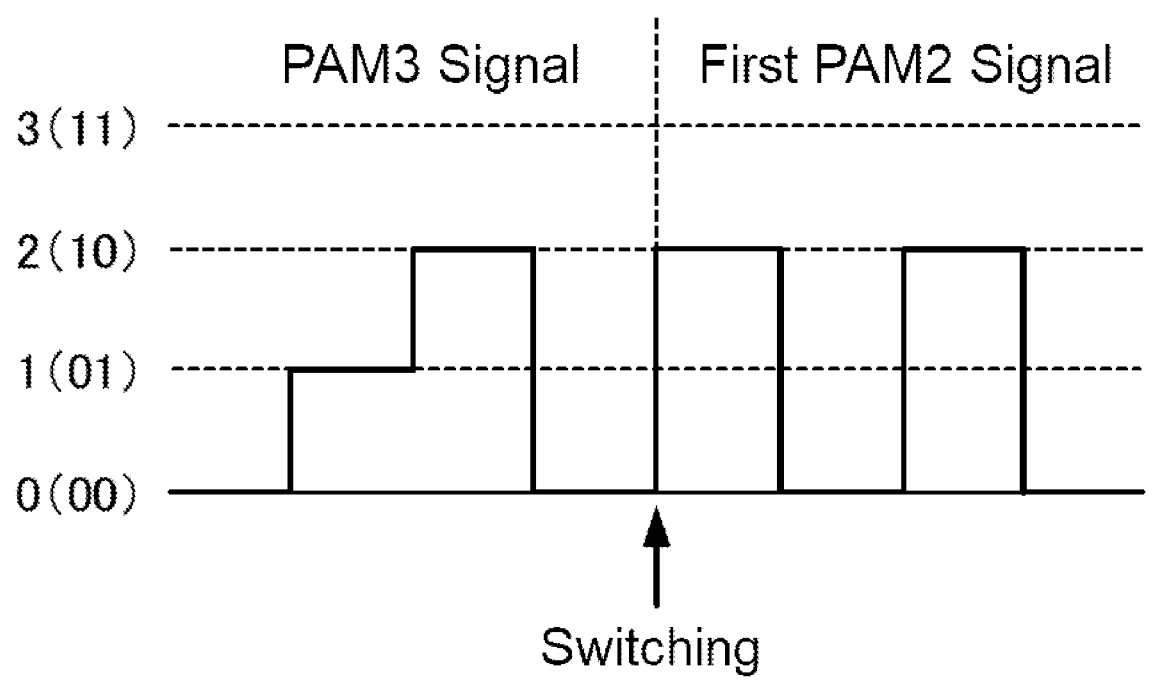
FIG. 2 is a diagram illustrating an output example of a PAM3 signal and a PAM2 signal before and after switching in the signal generation apparatus according to the first embodiment of the present invention.

In the signal generation apparatus 10 according to the present embodiment, when an input of the second PAM2 signal generated by the second NRZ generation circuit 12b to the adder 14 is blocked by the switch 13, the first PAM2 signal with the PAM2 symbols having two values of 0 (00) and 2 (10) and the PAM3 signal with the PAM3 symbols having three values of 0 (00), 1 (01), and 2 (10) are input to the selector 15. That is, as illustrated in FIG. 2, since maximum voltage levels of the PAM3 signal and the first PAM2 signal input to the selector 15 are equal to each other, it is not necessary to adjust a voltage of each signal when the selector 15 switches between the PAM3 signal and the first PAM2 signal.

Figure 3A:
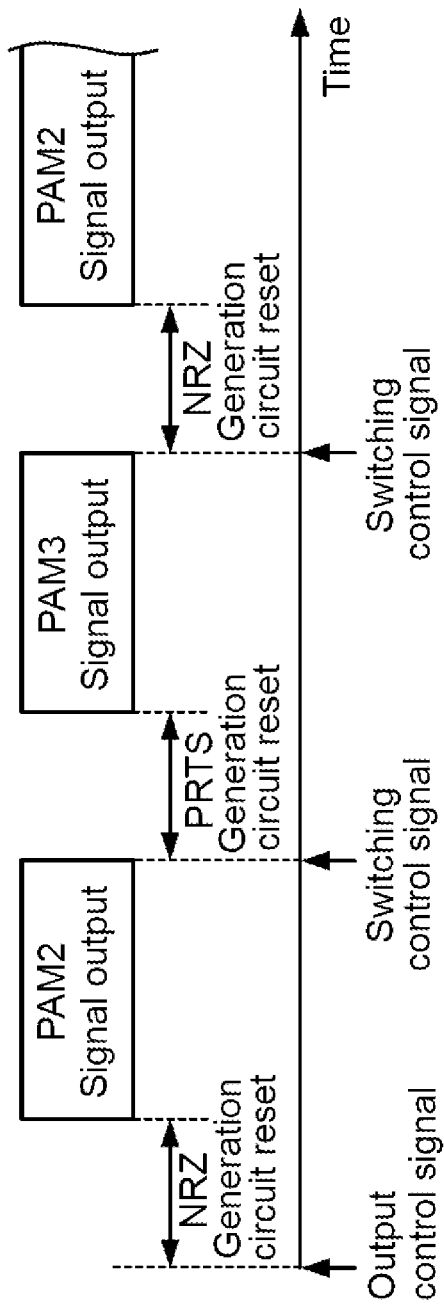
FIG. 3A is a diagram for explaining an output timing of a PAM2 signal and a PAM3 signal by a signal generation apparatus in the related art.
Figure 17:
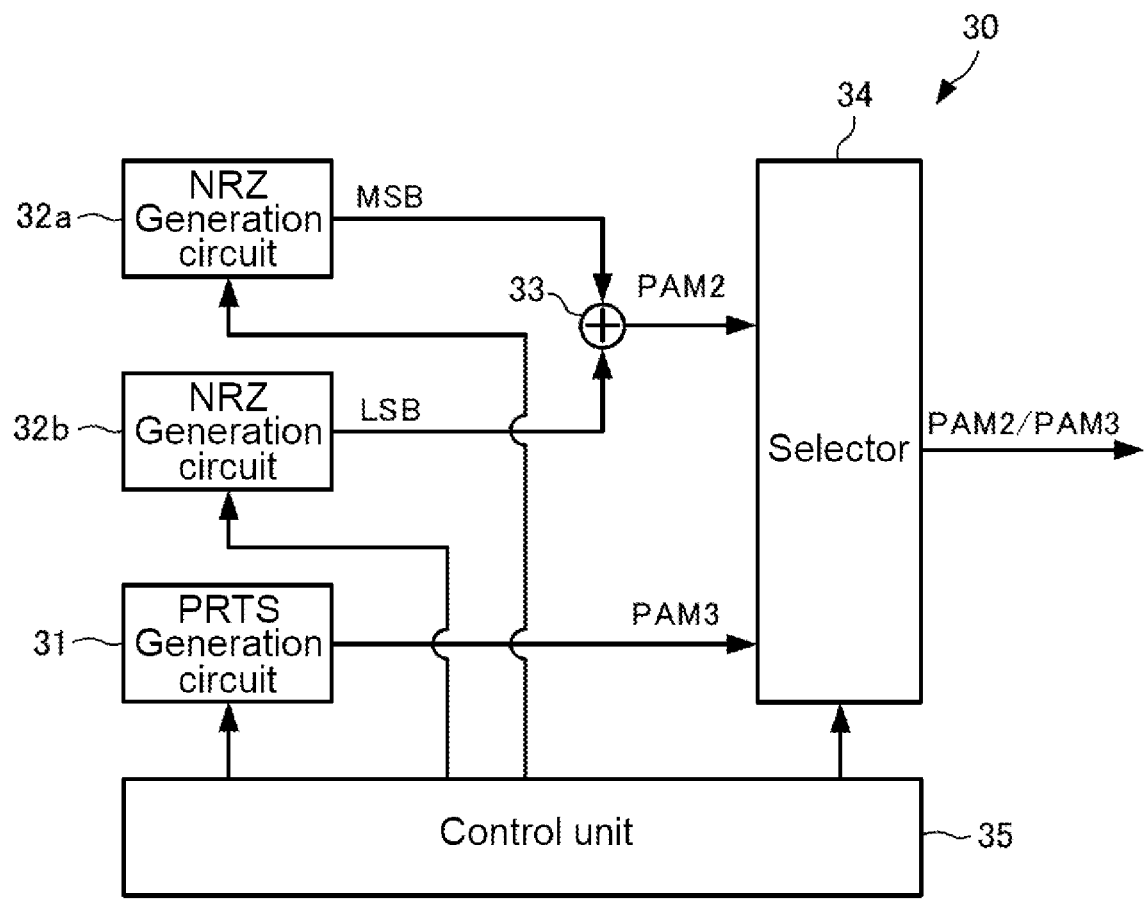
FIG. 17 is a block diagram illustrating a configuration of the signal generation apparatus in the related art.
Figure 18:
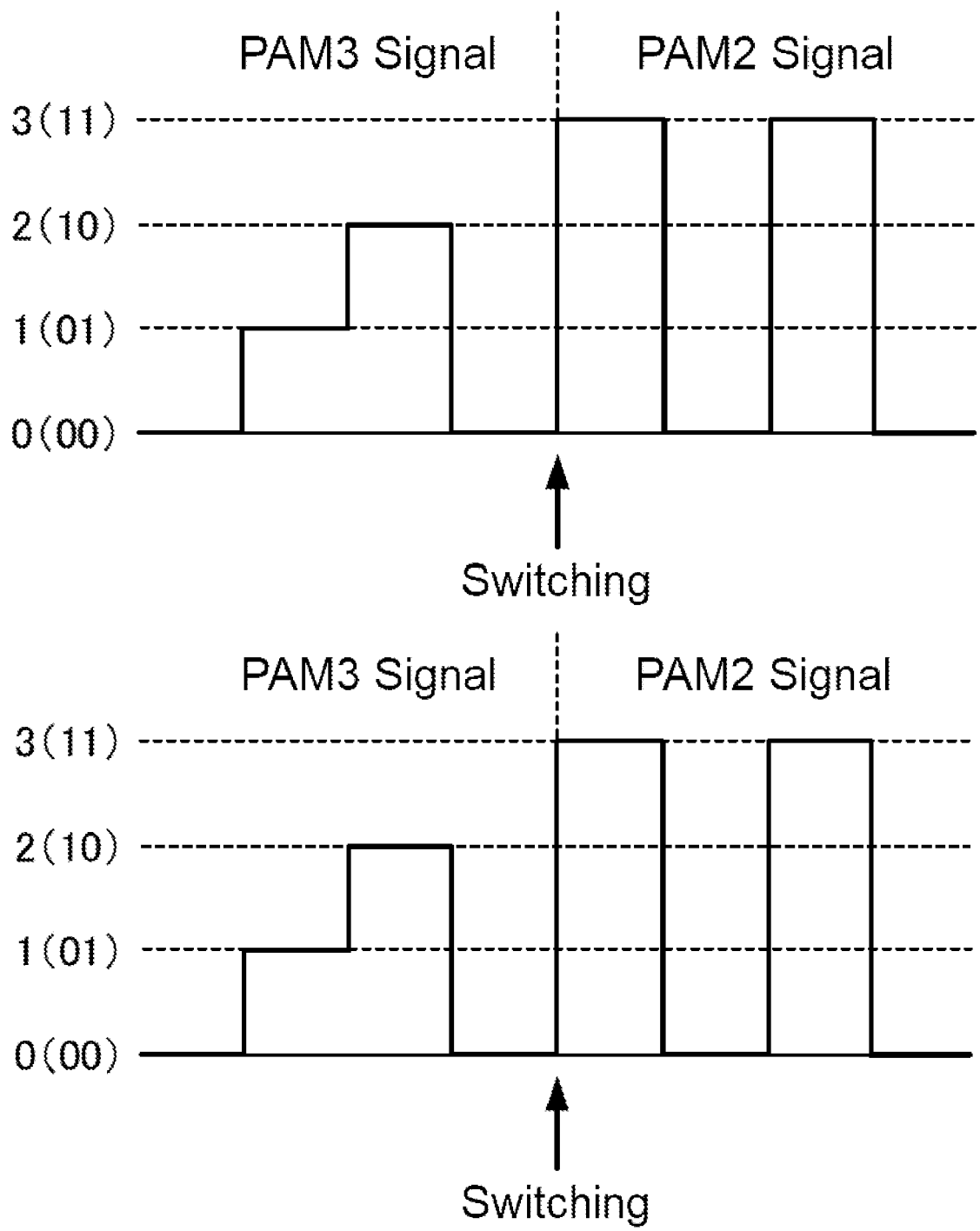
FIG. 18 is a diagram illustrating an output example of a PAM3 signal and a PAM2 signal before and after switching in the signal generation apparatus in the related art.

FIG. 3A is a diagram illustrating an example of an output timing of a PAM2 signal and a PAM3 signal by the signal generation apparatus 30 in the related art illustrated in FIG. 17. First, when an output control signal for outputting the PAM2 signal is output from the control unit 35, the NRZ generation circuits 32a and 32b start an output of the PAM2 signal after completing an initialization process and a generation process of the PAM2 signal. In the initialization process, a process of giving a predetermined initial value to the NRZ generation circuits 32a and 32b or the like is performed so that the PAM2 signals output from the NRZ generation circuits 32a and 32b always start with the identical data each time the initialization process is performed. Further, in the generation process, the NRZ generation circuits 32a and 32b generate the PAM2 signal having the pseudo-random pattern based on the initial value set in the initialization process.

Next, when a switching control signal for switching the output signal from the selector 34 from the PAM2 signal to the PAM3 signal is output from the control unit 35, the NRZ generation circuits 32a and 32b stop the output of the PAM2 signal. The PRTS generation circuit 31 starts outputting the PAM3 signal after completing an initialization process and a generation process of the PAM3 signal. In the initialization process, a process of giving a predetermined initial value to the PRTS generation circuit 31 is performed so that the PAM3 signal output from the PRTS generation circuit 31 always starts with the identical data each time the initialization process is performed. Further, in the generation process, the PRTS generation circuit 31 generates the PAM3 signal having the pseudo-random pattern based on the initial value set in the initialization process.

Next, when a switching control signal for switching the output signal from the selector 34 from the PAM3 signal to the PAM2 signal is output from the control unit 35, the PRTS generation circuit 31 stops the output of the PAM3 signal. The NRZ generation circuits 32a and 32b start outputting the PAM2 signal after completing the initialization process and the generation process of the PAM2 signal described above.

In this manner, since the signal generation apparatus 30 in the related art temporarily stops all signal outputs from the NRZ generation circuits 32a and 32b and the PRTS generation circuit 31 when the output signal is switched by the selector 34, there is a problem that a signal output stop section occurs.

Figure 3B:
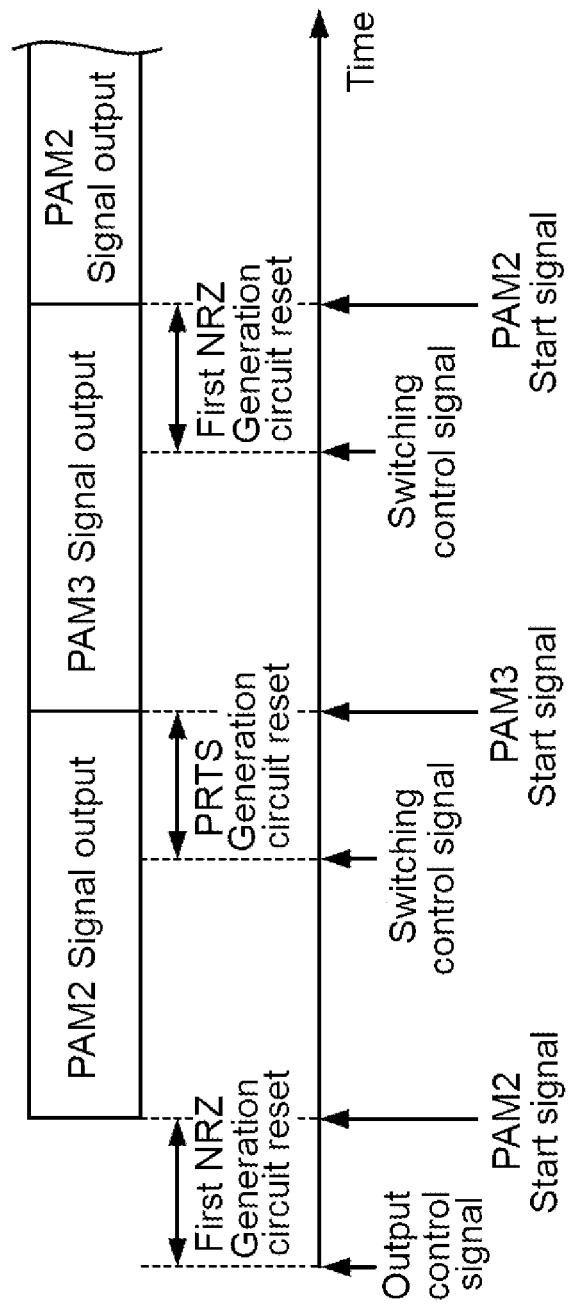
FIG. 3B is a diagram for explaining an output timing of the first PAM2 signal and the PAM3 signal according to the signal generation apparatus according to the first embodiment of the present invention.

FIG. 3B is a diagram illustrating an example of an output timing of a first PAM2 signal and a PAM3 signal by the signal generation apparatus 10 according to the present embodiment. First, when an output control signal for outputting a first PAM2 signal is output from the control unit 19, the first NRZ generation circuit 12a starts outputting the first PAM2 signal after completing an initialization process and a generation process of the first PAM2 signal. In the initialization process, a process of giving a predetermined initial value to the first NRZ generation circuit 12a is performed so that the first PAM2 signal output from the first NRZ generation circuit 12a always starts with the identical data each time the initialization process is performed. In addition, in the generation process, the first NRZ generation circuit 12a generates the first PAM2 signal having the pseudo-random pattern based on the initial value set in the initialization process. Further, the first NRZ generation circuit 12a outputs the generated first PAM2 signal and a PAM2 start signal synchronized with a head position of the first PAM2 signal. The selector 15 outputs the first PAM2 signal together with the PAM2 start signal, by using the input of the PAM2 start signal as a trigger.

Next, when a switching control signal for switching the output signal from the selector 15 from the first PAM2 signal to the PAM3 signal is output from the control unit 19, the PRTS generation circuit 11 starts an initialization process and a generation process of the PAM3 signal by using the input of the switching control signal as a trigger. In the initialization process, a process of giving a predetermined initial value to the PRTS generation circuit 11 is performed so that the PAM3 signal output from the PRTS generation circuit 11 always starts with the identical data each time the initialization process is performed. In addition, in the generation process, the PRTS generation circuit 11 generates the PAM3 signal having the pseudo-random pattern based on the initial value set in the initialization process. Further, the PRTS generation circuit 11 outputs the generated PAM3 signal and a PAM3 start signal synchronized with a head position of the PAM3 signal. The selector 15 continues to output the first PAM2 signal until the PAM3 start signal is input together with the PAM3 signal from the PRTS generation circuit 11, and outputs the PAM3 signal together with the PAM3 start signal instead of the first PAM2 signal, by using the input of the PAM3 start signal as a trigger.

Next, when a switching control signal for switching the output signal from the selector 15 from the PAM3 signal to the first PAM2 signal is output from the control unit 19, the first NRZ generation circuit 12a starts the initialization process and the generation process of the first PAM2 signal described above by using the input of the switching control signal as a trigger. Next, the first NRZ generation circuit 12a outputs the generated first PAM2 signal and a PAM2 start signal synchronized with a head position of the first PAM2 signal. The selector 15 continues to output the PAM3 signal until the PAM2 start signal is input together with the first PAM2 signal from the first NRZ generation circuit 12a, and outputs the first PAM2 signal together with the PAM2 start signal instead of the PAM3 signal, by using the input of the PAM2 start signal as a trigger.

In this manner, the signal generation apparatus 10 according to the present embodiment can perform mutual switching between the first PAM2 signal and the PAM3 signal without a signal output stop section occurring when the output signal is switched by the selector 15.

Hereinafter, a problem related to precoding in the signal generation apparatus 30 in the related art will be described. When precoding is performed on a PAM3 signal immediately after an output signal of the signal generation apparatus 30 in the related art is switched from a PAM2 signal to the PAM3 signal, for example, ON control of a precoding process needs to be performed by the CPU during the signal output stop section. Since the precoding is not performed on the PAM2 signal, in a case where the output signal is switched from the PAM3 signal to the PAM2 signal, it is necessary to perform OFF control of the precoding process. Meanwhile, since a processing speed of the CPU is slower than that of a precoding circuit configured on the FPGA, in the signal generation apparatus 30 in the related art, the ON/OFF control of the precoding process cannot be performed in time during the stop section.

Figure 4:
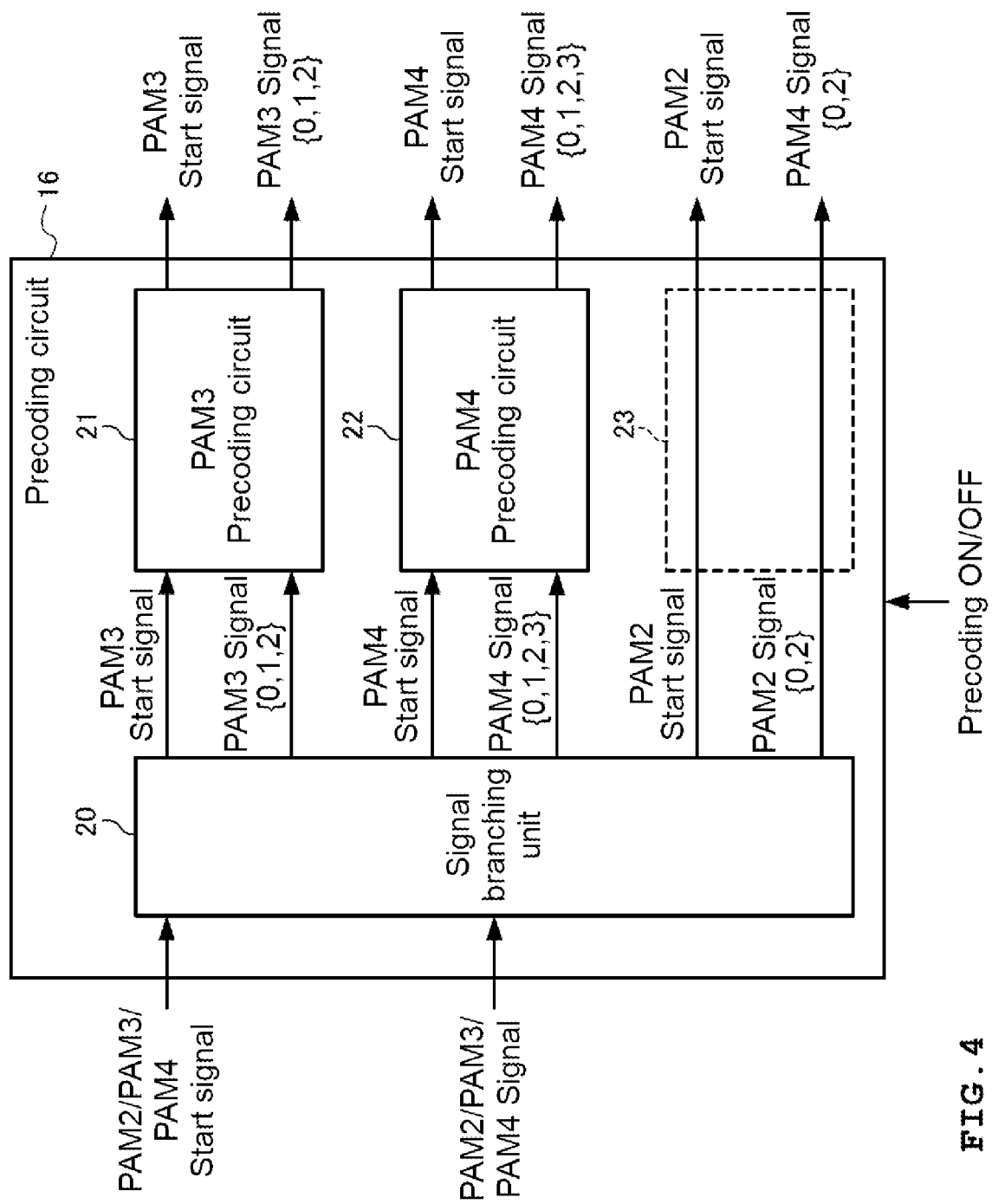
FIG. 4 is a block diagram illustrating a configuration of a precoding circuit included in the signal generation apparatus according to the first embodiment of the present invention.

As illustrated in FIG. 4, the precoding circuit 16 included in the signal generation apparatus 10 according to the present embodiment includes a signal branching unit 20, a PAM3 precoding circuit 21, a PAM4 precoding circuit 22, and a through circuit 23.

The signal branching unit 20 inputs a PAM3 start signal and a PAM3 signal output from the selector 15, to the PAM3 precoding circuit 21. In addition, the signal branching unit 20 inputs a PAM4 start signal and a PAM4 signal output from the selector 15, to the PAM4 precoding circuit 22.

Further, the signal branching unit 20 inputs a PAM2 start signal and a first PAM2 signal output from the selector 15, to the through circuit 23.

In a case where the precoding process on the PAM3 signal is set to ON by an operation input to the operation unit 18 by the user in advance, the PAM3 precoding circuit 21 performs precoding on symbols constituting the PAM3 signal input from the signal branching unit 20 by using the input of the PAM3 start signal from the signal branching unit 20 as a trigger. Further, the PAM3 precoding circuit 21 outputs the PAM3 start signal and the PAM3 signal after precoding, to the error insertion circuit 17 in the subsequent stage. On the other hand, in a case where the precoding process on the PAM3 signal is set to OFF by an operation input to the operation unit 18 by the user in advance, the PAM3 precoding circuit 21 outputs the PAM3 start signal and the PAM3 signal as they are, to the error insertion circuit 17 by using the input of the PAM3 start signal from the signal branching unit 20 as a trigger.

In a case where the precoding process on the PAM4 signal is set to ON by an operation input to the operation unit 18 by the user in advance, the PAM4 precoding circuit 22 performs precoding on symbols constituting the PAM4 signal input from the signal branching unit 20 by using the input of the PAM4 start signal from the signal branching unit 20 as a trigger. Further, the PAM4 precoding circuit 22 outputs the PAM4 start signal and the PAM4 signal after precoding, to the error insertion circuit 17 in the subsequent stage. On the other hand, in a case where the precoding process on the PAM4 signal is set to OFF by an operation input to the operation unit 18 by the user in advance, the PAM4 precoding circuit 22 outputs the PAM4 start signal and the PAM4 signal as they are, to the error insertion circuit 17 by using the input of the PAM4 start signal from the signal branching unit 20 as a trigger.

Regardless of the ON/OFF setting of the precoding process by the operation input to the operation unit 18 by the user, the through circuit 23 outputs the PAM2 start signal and the first PAM2 signal as they are, to the error insertion circuit 17 by using the input of the PAM2 start signal from the signal branching unit 20 as a trigger.

In this manner, by using the PAM3 start signal and the PAM4 start signal as a trigger, the precoding circuit 16 according to the present embodiment can start the precoding process from heads of those signals, at the same time that the PAM3 signal or the PAM4 signal is input.

Hereinafter, characteristics of an error insertion process by the signal generation apparatus 10 according to the present embodiment will be described.

There is a difference in an error insertion method between the first PAM2 signal and the PAM3 signal. The error insertion circuit 17 included in the signal generation apparatus 10 performs error insertion only on an MSB for the first PAM2 signal, but determines values of symbols for the PAM3 signal, and, for example, an error such that a transition of the symbol becomes one symbol. Here, it is considered that in a state in which the error insertion circuit 17 performs error insertion on the first PAM2 signal, the selector 15 switches the output signal from the first PAM2 signal to the PAM3 signal while the CPU switches the error insertion process. In this case, a processing speed of the CPU is slower than that of the error insertion circuit 17 configured on the FPGA, so that this causes a problem that the switching control of the error insertion process cannot be performed in time at the signal switching timing by the selector 15. Therefore, for example, 1 (01) of the PAM3 signal is converted into 3 (11) by the error insertion process on the first PAM2 signal, and the overvoltage described in the related art occurs.

Therefore, in a case where the error insertion process on the PAM3 signal is set to ON by an operation input to the operation unit 18 by the user in advance, the error insertion circuit 17 included in the signal generation apparatus 10 according to the present embodiment inserts an error into symbols constituting the PAM3 signal input from the precoding circuit 16 by using the input of the PAM3 start signal from the precoding circuit 16 as a trigger. Further, the error insertion circuit 17 outputs the PAM3 signal after the error insertion. On the other hand, in a case where the error insertion process on the PAM3 signal is set to OFF by the operation input to the operation unit 18 by the user in advance, the error insertion circuit 17 outputs the PAM3 signal as it is, by using the input of the PAM3 start signal from the precoding circuit 16 as a trigger.

In addition, in a case where the error insertion process on the first PAM2 signal is set to ON by an operation input to the operation unit 18 by the user in advance, the error insertion circuit 17 inserts an error into symbols constituting the first PAM2 signal input from the precoding circuit 16 by using the input of the PAM2 start signal from the precoding circuit 16 as a trigger. Further, the error insertion circuit 17 outputs the first PAM2 signal after the error insertion. On the other hand, in a case where the error insertion process on the first PAM2 signal is set to OFF by the operation input to the operation unit 18 by the user in advance, the error insertion circuit 17 outputs the first PAM2 signal as it is, by using the input of the PAM2 start signal from the precoding circuit 16 as a trigger.

In addition, in a case where the error insertion process on the PAM4 signal is set to ON by an operation input to the operation unit 18 by the user in advance, the error insertion circuit 17 inserts an error into symbols constituting the PAM4 signal input from the precoding circuit 16 by using the input of the PAM4 start signal from the precoding circuit 16 as a trigger. Further, the error insertion circuit 17 outputs the PAM4 signal after the error insertion. On the other hand, in a case where the error insertion process on the PAM4 signal is set to OFF by the operation input to the operation unit 18 by the user in advance, the error insertion circuit 17 outputs the PAM4 signal as it is, by using the input of the PAM4 start signal from the precoding circuit 16 as a trigger.

In this manner, by using the PAM3 start signal and the PAM2/PAM4 start signal as a trigger, the error insertion circuit 17 according to the present embodiment can start the error insertion process from heads of those signals, at the same time that the first PAM2 signal and the PAM3 signal or the PAM4 signal are input.

The operation unit 18 illustrated in FIG. 1 is for accepting an operation input by the user, and is configured with, for example, a touch panel provided on a surface of a display screen of a display apparatus. Alternatively, the operation unit 18 may include an input device such as a keyboard or a mouse. In addition, the operation unit 18 may be configured with an external control apparatus which performs remote control by using a remote command or the like. The operation input to the operation unit 18 is detected by the control unit 19. For example, the user can cause the operation unit 18 to perform any setting such as the number of stages of the PRTS generation polynomial and the PRBS generation polynomial in the PRTS generation circuit 11, the first NRZ generation circuit 12a, and the second NRZ generation circuit 12b, an output instruction of the output control signal and the switching control signal, and an ON/OFF setting of the switch 13, the precoding circuit 16, and the error insertion circuit 17.

The control unit 19 is configured with, for example, a microcomputer, a personal computer, or the like including a CPU, a read only memory (ROM), a random access memory (RAM), a hard disk drive (HDD), and controls an operation of each of the units described above constituting the signal generation apparatus 10. In addition, the control unit 19 causes each circuit of the PRTS generation circuit 11, the first NRZ generation circuit 12a, and the second NRZ generation circuit 12b to output an output control signal for outputting the PAM3 signal, the first PAM2 signal, and the second PAM2 signal, according to an operation input to the operation unit 18 by the user. Further, the control unit 19 outputs a switching control signal for mutually switching the output signal from the selector 15 among the first PAM2 signal, the PAM3 signal, and the PAM4 signal. The PRTS generation circuit 11, the first NRZ generation circuit 12a, the second NRZ generation circuit 12b, the switch 13, the adder 14, the selector 15, the precoding circuit 16, and the error insertion circuit 17 can be configured, for example, with a digital circuit such as a field programmable gate array (FPGA) or an application specific integrated circuit (ASIC).

Hereinafter, an example of a process of a signal generation method using the signal generation apparatus 10 according to the present embodiment will be described with reference to the flowcharts in FIGS. 5 and 6. In the flowchart in FIG. 5, a process of switching an output signal from the selector 15 from a PAM3 signal to a first PAM2 signal will be described.

Figure 5:
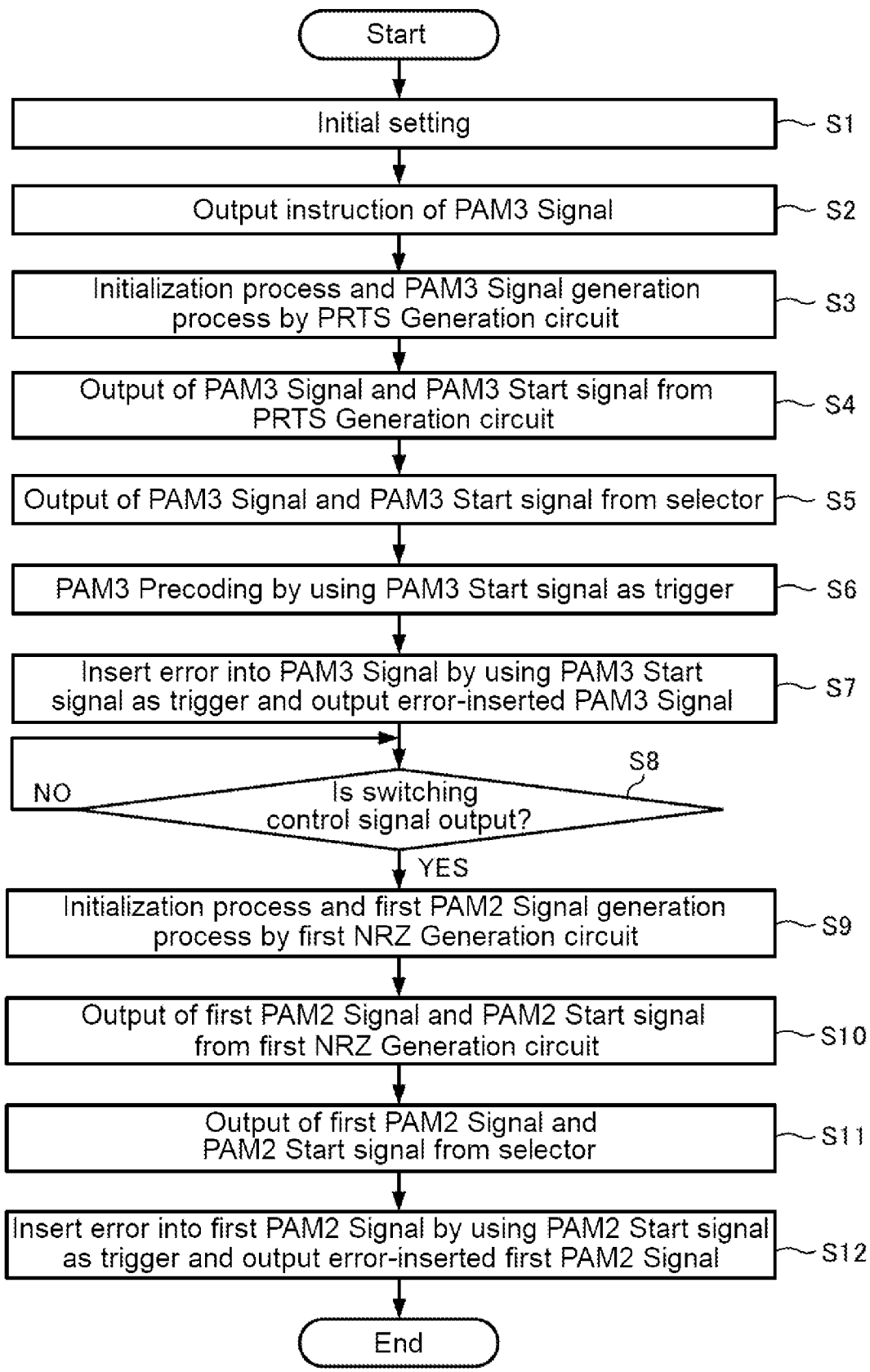
FIG. 5 is a flowchart (part 1) illustrating a process of a signal generation method using the signal generation apparatus according to the first embodiment of the present invention.
Figure 6:
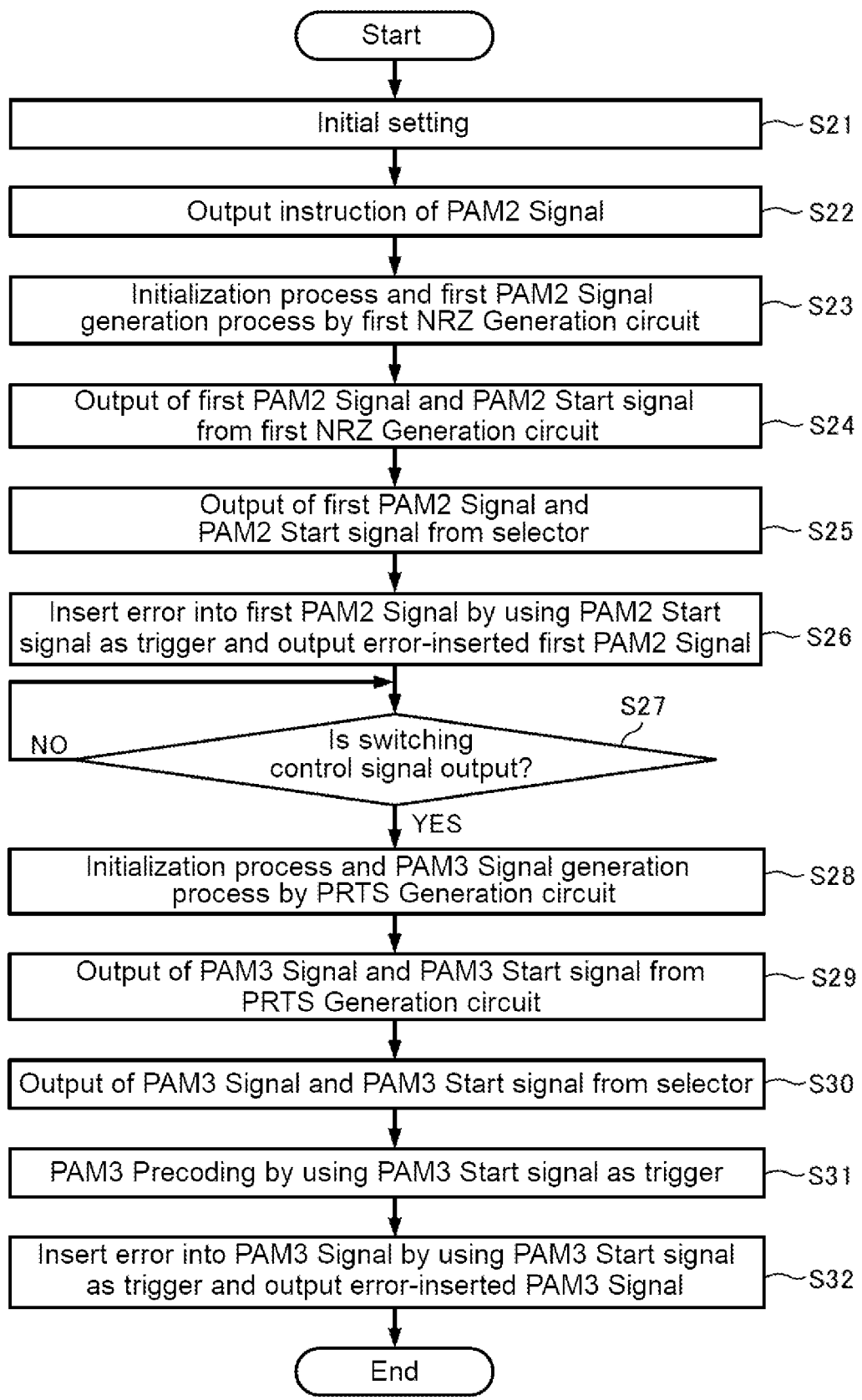
FIG. 6 is a flowchart (part 2) illustrating the process of the signal generation method using the signal generation apparatus according to the first embodiment of the present invention.

As illustrated in FIG. 5, first, by an operation input to the operation unit 18 by the user, the control unit 19 performs an initial setting such as a setting of the number of stages of the PRTS generation polynomial and the PRBS generation polynomial in each circuit of the PRTS generation circuit 11, the first NRZ generation circuit 12a, and the second NRZ generation circuit 12b or an ON/OFF setting of the switch 13, the precoding circuit 16, and the error insertion circuit 17 (step S1).

Next, the control unit 19 outputs an output control signal to the PRTS generation circuit 11 in response to an operation input to the operation unit 18 by the user (step S2).

Next, the PRTS generation circuit 11 performs an initialization process and a generation process of the PAM3 signal based on the initial setting in step S1 (step S3).

Next, the PRTS generation circuit 11 outputs the generated PAM3 signal and the PAM3 start signal synchronized with a head position of the PAM3 signal, to the selector 15 (step S4).

Next, the selector 15 outputs the PAM3 signal together with the PAM3 start signal to the precoding circuit 16, by using the input of the PAM3 start signal as a trigger (step S5).

Next, in a case where the ON setting of the precoding process is performed on the PAM3 signal in advance in step S1, the precoding circuit 16 uses the input of the PAM3 start signal as a trigger to perform precoding on symbols constituting the PAM3 signal input from the selector 15 (step S6).

Next, in a case where the ON setting of the error insertion process is performed on the PAM3 signal in advance in step S1, the error insertion circuit 17 uses the input of the PAM3 start signal as a trigger to insert an error into the symbols constituting the PAM3 signal input from the precoding circuit 16 and outputs the error-inserted PAM3 signal (step S7).

Next, the control unit 19 determines whether or not there is an instruction to output a switching control signal for switching the output signal from the selector 15 from the PAM3 signal to the first PAM2 signal by an operation input to the operation unit 18 by the user. In a case where there is the instruction to output the switching control signal, the control unit 19 outputs the switching control signal to the first NRZ generation circuit 12a and the selector 15 (switching control step S8).

Next, the first NRZ generation circuit 12a performs an initialization process and a generation process of the first PAM2 signal by using the input of the switching control signal as a trigger, based on the initial setting in step S1 (step S9).

Next, the first NRZ generation circuit 12a outputs the generated first PAM2 signal and a PAM2 start signal synchronized with a head position of the first PAM2 signal to the selector 15 (step S10).

Next, the selector 15 outputs the first PAM2 signal together with the PAM2 start signal instead of the PAM3 signal to the error insertion circuit 17 via the through circuit 23 of the precoding circuit 16, by using the input of the PAM2 start signal as a trigger (step S11).

Next, in a case where the ON setting of the error insertion process is performed on the first PAM2 signal in step S1 in advance, by using the input of the PAM2 start signal as a trigger, the error insertion circuit 17 inserts an error into symbols constituting the first PAM2 signal input from the through circuit 23, and outputs the error-inserted first PAM2 signal (step S12).

In the above process, steps S3 and S4 constitute a PRTS generation step. Steps S9 and S10 constitute a first NRZ generation step. Steps S5 and S11 constitute a signal switching step.

Hereinafter, a process of switching an output signal from the selector 15 from a first PAM2 signal to a PAM3 signal will be described with reference to the flowchart in FIG. 6. As illustrated in FIG. 6, first, by an operation input to an operation unit 18 by the user, the control unit 19 performs an initial setting such as a setting of the number of stages of the PRTS generation polynomial and the PRBS generation polynomial in each circuit of the PRTS generation circuit 11, the first NRZ generation circuit 12a, and the second NRZ generation circuit 12b or an ON/OFF setting of the switch 13, the precoding circuit 16, and the error insertion circuit 17 (step S21).

Next, the control unit 19 outputs an output control signal to the first NRZ generation circuit 12a in response to an operation input to the operation unit 18 by the user (step S22).

Next, the first NRZ generation circuit 12a performs an initialization process and a generation process of the first PAM2 signal based on the initial settings in step S21 (step S23).

Next, the first NRZ generation circuit 12a outputs the generated first PAM2 signal and a PAM2 start signal synchronized with a head position of the first PAM2 signal, to the selector 15 (step S24).

Next, the selector 15 outputs the first PAM2 signal together with the PAM2 start signal to the error insertion circuit 17 via the through circuit 23 of the precoding circuit 16, by using the input of the PAM2 start signal as a trigger (step S25).

Next, in a case where the ON setting of the error insertion process is performed on the first PAM2 signal in step S21 in advance, by using the input of the PAM2 start signal as a trigger, the error insertion circuit 17 inserts an error into symbols constituting the first PAM2 signal input from the through circuit 23, and outputs the error-inserted first PAM2 signal (step S26).

Next, the control unit 19 determines whether or not there is an instruction to output a switching control signal for switching the output signal from the selector 15 from the PAM3 signal to the first PAM2 signal by an operation input to the operation unit 18 by the user. In a case where there is the instruction to output the switching control signal, the control unit 19 outputs the switching control signal to the PRTS generation circuit 11 and the selector 15 (switching control step S27).

Next, the PRTS generation circuit 11 performs an initialization process and a generation process of the PAM3 signal by using the input of the switching control signal as a trigger, based on the initial settings in step S21 (step S28).

Next, the PRTS generation circuit 11 outputs the generated PAM3 signal and a PAM3 start signal synchronized with a head position of the PAM3 signal to the selector 15 (step S29).

Next, the selector 15 outputs the PAM3 signal together with the PAM3 start signal instead of the first PAM2 signal to the precoding circuit 16, by using the input of the PAM3 start signal as a trigger (step S30).

Next, in a case where the ON setting of the precoding process is performed on the PAM3 signal in advance in step S21, the precoding circuit 16 uses the input of the PAM3 start signal as a trigger to perform precoding on symbols constituting the PAM3 signal input from the selector 15 (step S31).

Next, in a case where the ON setting of the error insertion process is performed on the PAM3 signal in advance in step S21, the error insertion circuit 17 uses the input of the PAM3 start signal as a trigger to insert an error into the symbols constituting the PAM3 signal input from the precoding circuit 16 and outputs the error-inserted PAM3 signal (step S32).

In the above process, steps S23 and S24 constitute the first NRZ generation step. Steps S28 and S29 constitute the PRTS generation step. Steps S25 and S30 constitute the signal switching step.

As described above, the signal generation apparatus 10 according to the present embodiment is configured so that maximum voltage levels of the first PAM2 signal and the PAM3 signal are set to be equal, so that it is not necessary to perform voltage adjustment when the selector 15 switches between the first PAM2 signal and the PAM3 signal. Therefore, the signal generation apparatus 10 can perform mutual switching between the first PAM2 signal and the PAM3 signal without generating a noise or an overvoltage due to a slow processing speed of the CPU as compared with the FPGA.

Further, when the output signal is switched from the PAM3 signal to the first PAM2 signal, the selector 15 included in the signal generation apparatus 10 according to the present embodiment continues to output the PAM3 signal until the PAM2 start signal synchronized with the head position of the first PAM2 signal is input together with the first PAM2 signal, and outputs the first PAM2 signal instead of the PAM3 signal, by using the input of the PAM2 start signal as a trigger. That is, the signal generation apparatus 10 also continues to output the PAM3 signal during a time from a generation start to a generation completion of the first PAM2 signal, so that the output signal can be switched from the PAM3 signal to the first PAM2 signal without generating a signal output stop section.

In addition, when the output signal is switched from the PAM3 signal to the first PAM2 signal, the selector 15 included in the signal generation apparatus 10 according to the present embodiment continues to output the first PAM2 signal until the PAM3 start signal synchronized with the head position of the PAM3 signal is input together with the PAM3 signal, and outputs the PAM3 signal instead of the first PAM2 signal by using the input of the PAM3 start signal as a trigger. That is, the signal generation apparatus 10 also continues to output the first PAM2 signal during a time from a generation start to a generation completion of the PAM3 signal, so that the output signal can be switched from the first PAM2 signal to the PAM3 signal without generating a signal output stop section.

In addition, the precoding circuit 16 included in the signal generation apparatus 10 according to the present embodiment can start the precoding process from a head of the PAM3 signal at the same time that the PAM3 signal is input, by using the PAM3 start signal synchronized with the head position of the PAM3 signal as a trigger.

In addition, the error insertion circuit 17 included in the signal generation apparatus 10 according to the present embodiment can start the error insertion process from a head of the PAM3 signal at the same time that the PAM3 signal is input, by using the PAM3 start signal synchronized with the head position of the PAM3 signal as a trigger.

Further, since the signal generation apparatus 10 according to the present embodiment includes the first NRZ generation circuit 12a and the second NRZ generation circuit 12b, it is possible to generate not only the PAM2 signal and the PAM3 signal but also the PAM4 signal.

In addition, according to the start signals flowing together with the signals generated by the PRTS generation circuit 11, the first NRZ generation circuit 12a, and the second NRZ generation circuit 12b, the signal generation apparatus 10 according to the present embodiment can switch the processing contents of the precoding circuit 16 and the error insertion circuit 17 according to types of the signals (PAM2, PAM3, and PAM4).

Second Embodiment

Subsequently, a signal generation apparatus according to the second embodiment of the present invention will be described with reference to the drawings. The same components as those in the first embodiment are given by the same reference numerals, and description thereof will be omitted as appropriate. Further, description of the same operation as that of the first embodiment will be omitted as appropriate.

Figure 7:
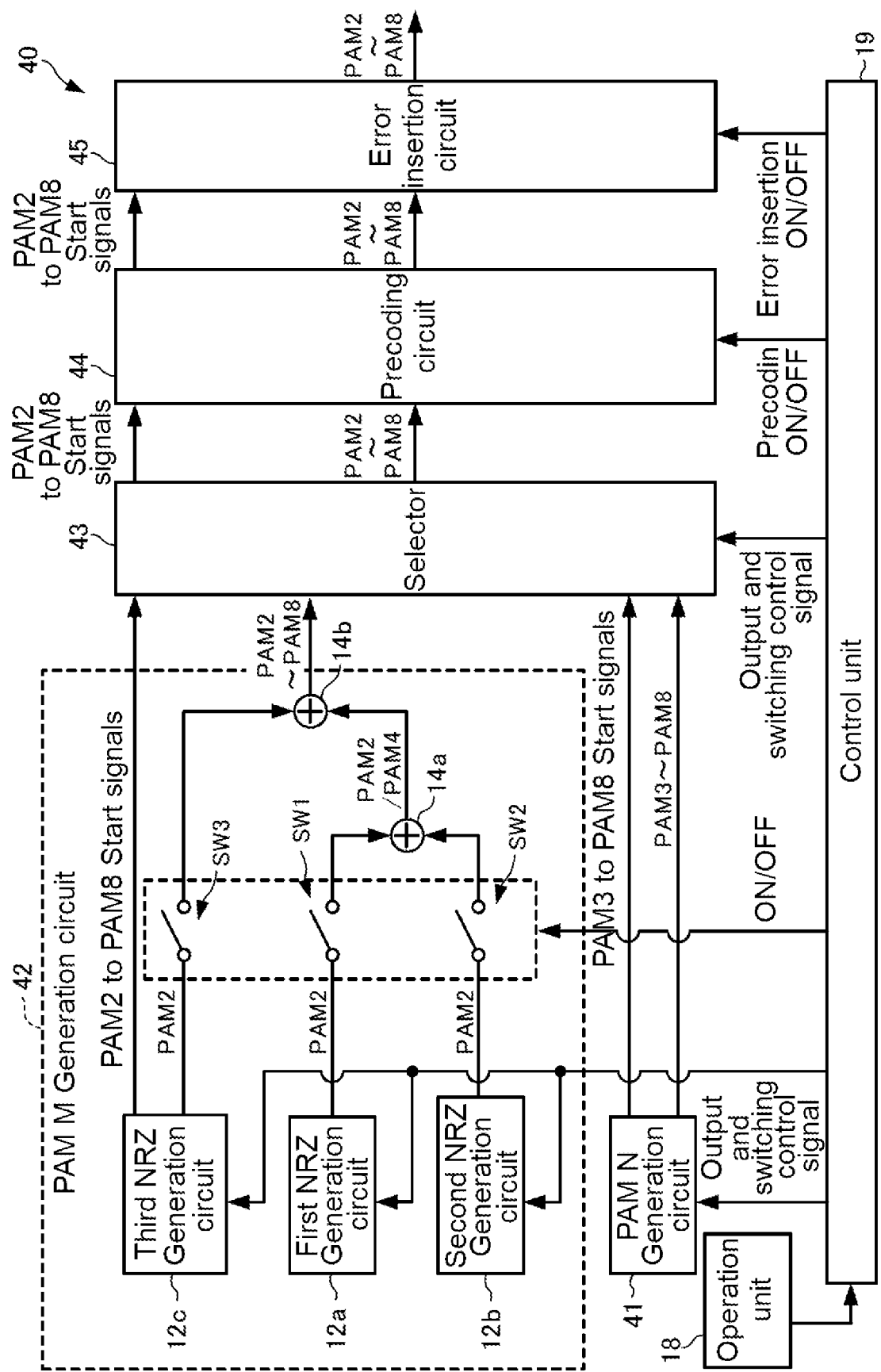
FIG. 7 is a block diagram illustrating a configuration of a signal generation apparatus according to a second embodiment of the present invention.

As illustrated in FIG. 7, a signal generation apparatus 40 according to the present embodiment includes a PAM N generation circuit 41, a PAM M generation circuit 42, a selector 43 as a signal switching unit, a precoding circuit 44, an error insertion circuit 45, the operation unit 18, and the control unit 19. The PAM N generation circuit 41, the PAM M generation circuit 42, the selector 43, the precoding circuit 44, and the error insertion circuit 45 are configured on, for example, an FPGA or an ASIC.

The PAM N generation circuit 41 is configured with the PRTS generation circuit 11 of the first embodiment. Further, the PAM M generation circuit 42 is configured with the first NRZ generation circuit 12a, the second NRZ generation circuit 12b, the switch 13, and the adder 14 of the first embodiment.

The control unit 19 is configured to include, for example, a micro-computer or a personal computer including a CPU, a ROM, a RAM, an HDD, and the like, and controls an operation of each of the units described above constituting the signal generation apparatus 40. Further, in the present embodiment, the control unit 19 outputs an output control signal for outputting a PAM N signal and a PAM M signal, which will be described later, from each circuit of the PAM N generation circuit 41 and the PAM M generation circuit 42 according to an operation input to the operation unit 18 by the user. Further, the control unit 19 outputs a switching control signal for mutually switching the output signal from the selector 43 between the PAM N signal and the PAM M signal.

Figure 8:
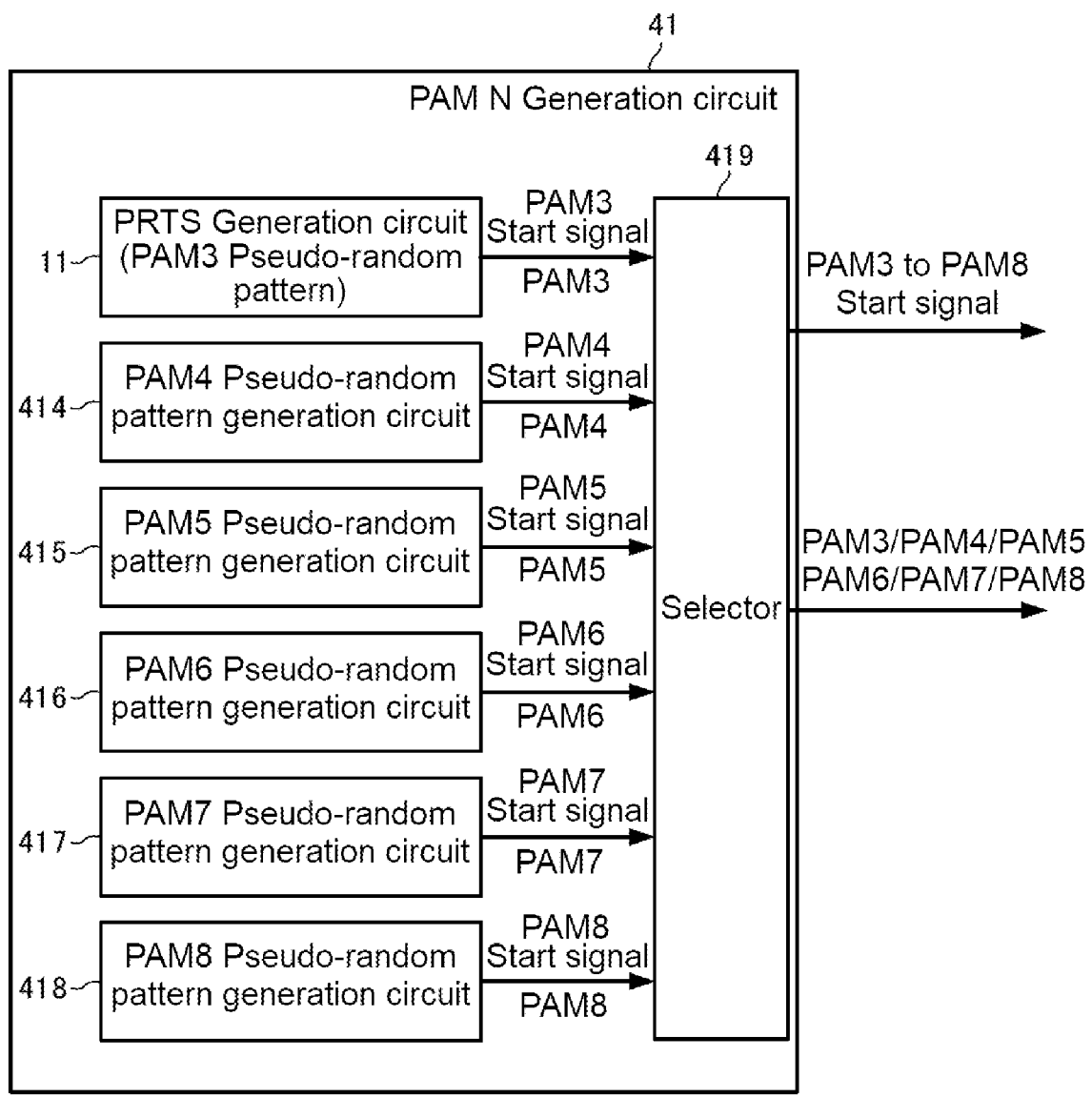
FIG. 8 is a block diagram illustrating a configuration of a PAM N generation circuit in FIG. 7.

The PAM N generation circuit 41 generates a PAM N signal having n values (n≥3). In the present embodiment, the PAM N signal is a general term for a PAM3 signal, a PAM4 signal, a PAM5 signal, a PAM6 signal, a PAM7 signal, and a PAM8 signal to be output from the PAM N generation circuit 41. As illustrated in FIG. 8, the PAM N generation circuit 41 includes the PRTS generation circuit 11, a PAM4 pseudo-random pattern generation circuit 414, a PAM5 pseudo-random pattern generation circuit 415, a PAM6 pseudo-random pattern generation circuit 416, a PAM7 pseudo-random pattern generation circuit 417, a PAM8 pseudo-random pattern generation circuit 418, and a selector 419.

Further, the PAM N generation circuit 41 generates a PAM N signal as a trigger by an input of the output control signal or the switching control signal from the control unit 19, and then outputs the generated PAM N signal and a PAM N start signal synchronized with a head position of the PAM N signal. The PAM N start signal is transmitted to the selector 43, the precoding circuit 44, and the error insertion circuit 45 in the subsequent stage, together with the PAM N signal. In the present embodiment, the PAM N start signal is a general term for a PAM3 start signal, a PAM4 start signal, a PAM5 start signal, a PAM6 start signal, a PAM7 start signal, and a PAM8 start signal respectively corresponding to the PAM3 signal, the PAM4 signal, the PAM5 signal, the PAM6 signal, the PAM7 signal, and the PAM8 signal output from the PAM N generation circuit 41.

The PRTS generation circuit 11 generates a PAM3 signal with a pseudo-random pattern of PAM3 symbols having three values of 0-level, 1-level, and 2-level according to a PRTS generation polynomial. Further, the PRTS generation circuit 11 outputs the generated PAM3 signal and a PAM3 start signal synchronized with a head position of the PAM3 signal.

The PAM4 pseudo-random pattern generation circuit 414 generates a PAM4 signal having a pseudo-random pattern with PAM4 symbols having four values of 0-level, 1-level, 2-level, and 3-level. Further, the PAM4 pseudo-random pattern generation circuit 414 outputs the generated PAM4 signal and a PAM4 start signal synchronized with a head position of the PAM4 signal.

The PAM5 pseudo-random pattern generation circuit 415 generates a PAM5 signal having a pseudo-random pattern with PAM5 symbols having five values of 0-level, 1-level, 2-level, 3-level, and 4-level. Further, the PAM5 pseudo-random pattern generation circuit 415 outputs the generated PAM5 signal and a PAM5 start signal synchronized with a head position of the PAM5 signal.

The PAM6 pseudo-random pattern generation circuit 416 generates a PAM6 signal having a pseudo-random pattern with PAM6 symbols having six values of 0-level, 1-level, 2-level, 3-level, 4-level, and 5-level. Further, the PAM6 pseudo-random pattern generation circuit 416 outputs the generated PAM6 signal and a PAM6 start signal synchronized with a head position of the PAM6 signal.

The PAM7 pseudo-random pattern generation circuit 417 generates a PAM7 signal having a pseudo-random pattern with PAM7 symbols having seven values of 0-level, 1-level, 2-level, 3-level, 4-level, 5-level, and 6-level. Further, the PAM7 pseudo-random pattern generation circuit 417 outputs the generated PAM7 signal and a PAM7 start signal synchronized with a head position of the PAM7 signal.

The PAM8 pseudo-random pattern generation circuit 418 generates a PAM8 signal having a pseudo-random pattern with PAM8 symbols having eight values of 0-level, 1-level, 2-level, 3-level, 4-level, 5-level, 6-level, and 7-level. Further, the PAM8 pseudo-random pattern generation circuit 418 outputs the generated PAM8 signal and a PAM8 start signal synchronized with a head position of the PAM8 signal.

The selector 419 outputs any one of the PAM3 signal generated by the PRTS generation circuit 11, the PAM4 signal generated by the PAM4 pseudo-random pattern generation circuit 414, the PAM5 signal generated by the PAM5 pseudo-random pattern generation circuit 415, the PAM6 signal generated by the PAM6 pseudo-random pattern generation circuit 416, the PAM7 signal generated by the PAM7 pseudo-random pattern generation circuit 417, and the PAM8 signal generated by the PAM8 pseudo-random pattern generation circuit 418, according to an operation input to the operation unit 18 by the user.

The PAM M generation circuit 42 generates a PAM M signal with m values (m<n) having a maximum voltage level equal to a maximum voltage level of the PAM N signal generated by the PAM N generation circuit 41. In the present embodiment, the PAM M signal is a general term for the PAM2 signal, PAM3 signal, PAM4 signal, PAM5 signal, PAM6 signal, and PAM7 signal output from the PAM M generation circuit 42. As illustrated in FIG. 7, the PAM M generation circuit 42 includes a first NRZ generation circuit 12a, a second NRZ generation circuit 12b, a third NRZ generation circuit 12c, a first switch SW1, a second switch SW2, a third switch SW3, a first adder 14a, and a second adder 14b. Values of the PAM N signal and the PAM M signal to be switched may be m=n as long as the PAM N signal and the PAM M signal have the same maximum voltage level. Therefore, the PAM M generation circuit 42 may generate a PAM8 signal as, for example, a PAM M signal.

Further, the PAM M generation circuit 42 generates a PAM M signal as a trigger by an input of the output control signal or the switching control signal from the control unit 19, and then outputs the generated PAM M signal and a PAM M start signal synchronized with a head position of the PAM M signal. The PAM M start signal is transmitted to the selector 43, the precoding circuit 44, and the error insertion circuit 45 in the subsequent stage, together with the PAM M signal. In the present embodiment, the PAM M start signal is a general term for a PAM2 start signal, a PAM3 start signal, a PAM4 start signal, a PAM5 start signal, a PAM6 start signal, a PAM7 start signal, and a PAM8 start signal respectively corresponding to the PAM2 signal, the PAM3 signal, the PAM4 signal, the PAM5 signal, the PAM6 signal, the PAM7 signal, and the PAM8 signal output from the PAM M generation circuit 42.

The first NRZ generation circuit 12a generates a first PAM2 signal with a pseudo-random pattern of PAM2 symbols having two values of 0-level and 2-level according to a PRBS generation polynomial.

The second NRZ generation circuit 12b generates a second PAM2 signal with a pseudo-random pattern of PAM2 symbols having two values of 0-level and 1-level according to a PRBS generation polynomial.

The third NRZ generation circuit 12c generates a third PAM2 signal with a pseudo-random pattern of PAM2 symbols having two values of 0-level and 4-level according to a PRBS generation polynomial.

The first switch SW1 passes or blocks (ON or OFF) the first PAM2 signal generated by the first NRZ generation circuit 12a. The second switch SW2 corresponds to the switch 13 in the first embodiment, and passes or blocks (ON or OFF) the second PAM2 signal generated by the second NRZ generation circuit 12b. The third switch SW3 passes or blocks (ON or OFF) the third PAM2 signal generated by the third NRZ generation circuit 12c.

The first adder 14a corresponds to the adder 14 of the first embodiment, and adds the output signal from the first switch SW1 and the output signal from the second switch SW2. The second adder 14b generates a PAM M signal by adding the output signal from the first adder 14a and the output signal from the third switch SW3.

The selector 43 outputs any one of the PAM N signal generated by the PAM N generation circuit 41 and the PAM M signal generated by the PAM M generation circuit 42, according to an operation input to the operation unit 18 by the user. In addition, the selector 43 continues to output the PAM N signal until the PAM M start signal is input together with the PAM M signal, and outputs the PAM M signal instead of the PAM N signal, by using the input of the PAM M start signal as a trigger. In addition, the selector 43 continues to output the PAM M signal until the PAM N start signal is input together with the PAM N signal, and outputs the PAM N signal instead of the PAM M signal, by using the input of the PAM N start signal as a trigger.

FIG. 9 is a table illustrating ON or OFF states of the first switch SW1, the second switch SW2, and the third switch SW3, an output available-level of each state, and a use of each state.

Figure 10A:
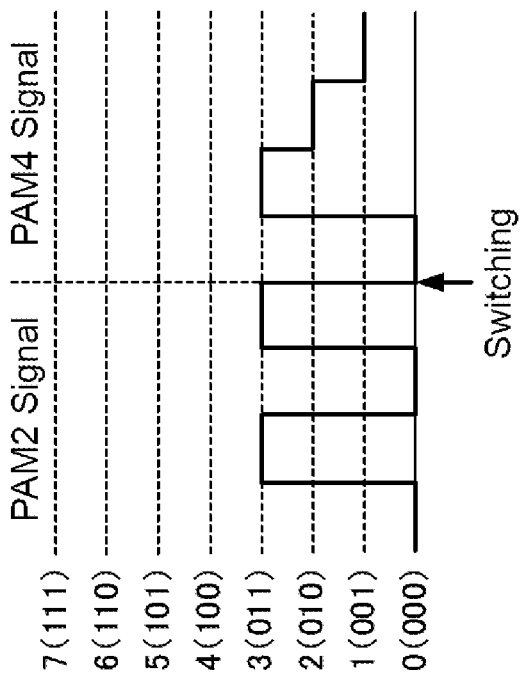
FIG. 10A is a diagram illustrating an output example of the PAM2 signal and the PAM3 signal before and after switching in a state 1 in which only the first switch is ON, FIG. 10B is a diagram illustrating an output example of the PAM2 signal and a PAM4 signal before and after switching in a state 2 in which only the third switch is OFF.

A state 1 is a state in which only the first switch SW1 is turned ON and the second switch SW2 and the third switch SW3 are turned OFF. At this time, the first PAM2 signal having two values of 0-level and 2-level is output from the first NRZ generation circuit 12a. That is, the PAM M generation circuit 42 can output voltages corresponding to 0-level and 2-level to the selector 43. For example, as illustrated in FIG. 10A, since maximum voltage levels of the PAM3 signal having three values of 0-level, 1-level, and 2-level generated by the PRTS generation circuit 11 of the PAM N generation circuit 41 and the PAM2 signal having two values of 0-level and 2-level generated by the PAM M generation circuit 42 are equal to each other, it is not necessary to adjust a voltage of each signal when the selector 43 switches between these signals.

Figure 10B:
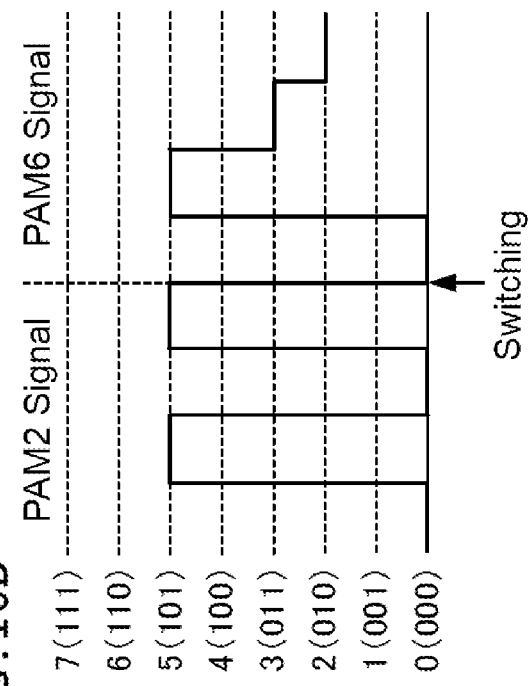
FIG. 10C is a diagram illustrating an output example of the PAM2 signal and a PAM5 signal before and after switching in a state 3 in which only the third switch is ON, and FIG. 10D is a diagram illustrating an output example of the PAM2 signal and a PAM6 signal before and after switching in a state 4 in which only the first switch is OFF.

A state 2 is a state in which the first switch SW1 and the second switch SW2 are turned ON, and only the third switch SW3 is turned OFF. At this time, the first PAM2 signal having two values of 0-level and 2-level is output from the first NRZ generation circuit 12a, and the second PAM2 signal having two values of 0-level and 1-level is output from the second NRZ generation circuit 12b. That is, the PAM M generation circuit 42 can output voltages corresponding to 0-level, 1-level, 2-level, and 3-level to the selector 43. For example, as illustrated in FIG. 10B, since maximum voltage levels of the PAM4 signal having four values of 0-level, 1-level, 2-level, and 3-level generated by the PAM4 pseudo-random pattern generation circuit 414 of the PAM N generation circuit 41 and the PAM2 signal having two values of 0-level and 3-level generated by the PAM M generation circuit 42 are equal to each other, it is not necessary to adjust a voltage of each signal when the selector 43 switches between these signals.

Figure 10C:
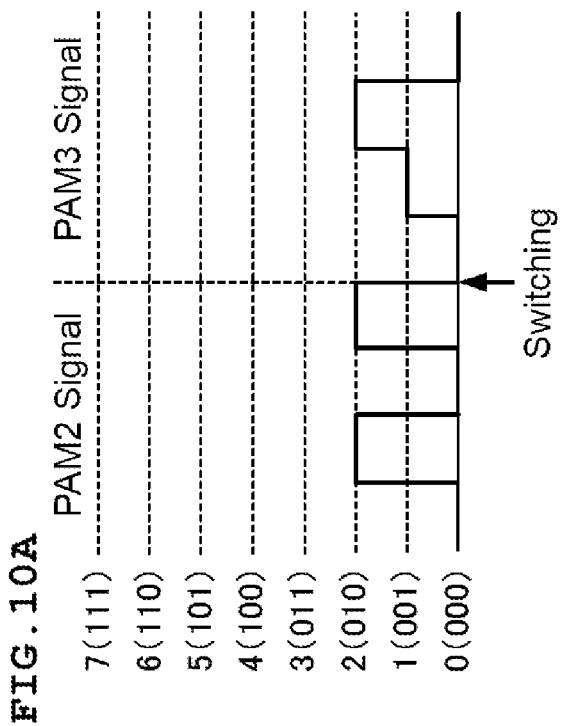

A state 3 is a state in which only the third switch SW3 is turned ON. At this time, the third PAM2 signal having two values of 0-level and 4-level is output from the third NRZ generation circuit 12c. That is, the PAM M generation circuit 42 can output voltages corresponding to 0-level and 4-level to the selector 43. For example, as illustrated in FIG. 10C, since maximum voltage levels of the PAM5 signal having five values of 0-level, 1-level, 2-level, 3-level, and 4-level generated by the PAM5 pseudo-random pattern generation circuit 415 of the PAM N generation circuit 41 and the third PAM2 signal having two values of 0-level and 4-level generated by the PAM M generation circuit 42 are equal to each other, it is not necessary to adjust a voltage of each signal when the selector 43 switches between these signals.

Figure 10D:
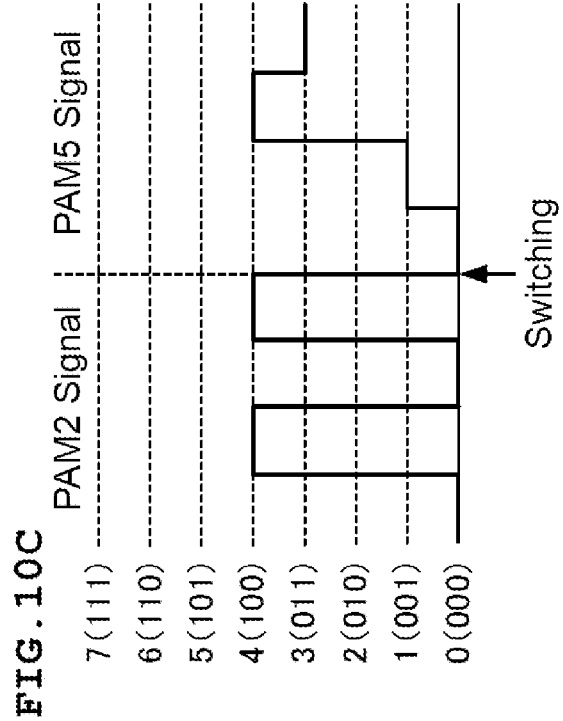

A state 4 is a state in which the second switch SW2 and the third switch SW3 are turned ON, and only the first switch SW1 is turned OFF. At this time, the second PAM2 signal having two values of 0-level and 1-level is output from the second NRZ generation circuit 12b, and the third PAM2 signal having two values of 0-level and 4-level is output from the third NRZ generation circuit 12c. That is, the PAM M generation circuit 42 can output voltages corresponding to 0-level, 1-level, 4-level, and 5-level to the selector 43. For example, as illustrated in FIG. 10D, since maximum voltage levels of the PAM6 signal having six values of 0-level, 1-level, 2-level, 3-level, 4-level, and 5-level generated by the PAM6 pseudo-random pattern generation circuit 416 of the PAM N generation circuit 41 and the PAM2 signal having two values of 0-level and 5-level generated by the PAM M generation circuit 42 are equal to each other, it is not necessary to adjust a voltage of each signal when the selector 43 switches between these signals. Alternatively, as illustrated in FIG. 11A, since maximum voltage levels of the PAM6 signal having six values of 0-level, 1-level, 2-level, 3-level, 4-level, and 5-level generated by the PAM6 pseudo-random pattern generation circuit 416 of the PAM N generation circuit 41 and the PAM4 signal having four values of 0-level, 1-level, 4-level, and 5-level generated by the PAM M generation circuit 42 are equal to each other, it is not necessary to adjust a voltage of each signal when the selector 43 switches between these signals.

A state 5 is a state in which the first switch SW1 and the third switch SW3 are turned ON, and only the second switch SW2 is turned OFF. At this time, the first PAM2 signal having two values of 0-level and 2-level is output from the first NRZ generation circuit 12a, and the third PAM2 signal having two values of 0-level and 4-level is output from the third NRZ generation circuit 12c. That is, the PAM M generation circuit 42 can output voltages corresponding to 0-level, 2-level, 4-level, and 6-level to the selector 43. For example, as illustrated in FIG. 11B, since maximum voltage levels of the PAM7 signal having seven values of 0-level, 1-level, 2-level, 3-level, 4-level, 5-level, and 6-level generated by the PAM7 pseudo-random pattern generation circuit 417 of the PAM N generation circuit 41 and the PAM2 signal having two values of 0-level and 6-level generated by the PAM M generation circuit 42 are equal to each other, it is not necessary to adjust a voltage of each signal when the selector 43 switches between these signals. Alternatively, as illustrated in FIG. 11C, since maximum voltage levels of the PAM7 signal having seven values of 0-level, 1-level, 2-level, 3-level, 4-level, 5-level, and 6-level generated by the PAM7 pseudo-random pattern generation circuit 417 of the PAM N generation circuit 41 and the PAM4 signal having four values of 0-level, 2-level, 4-level, and 6-level generated by the PAM M generation circuit 42 are equal to each other, it is not necessary to adjust a voltage of each signal when the selector 43 switches between these signals.

A state 6 is a state in which the first switch SW1, the second switch SW2, and the third switch SW3 are all ON. At this time, the first PAM2 signal having two values of 0-level and 2-level is output from the first NRZ generation circuit 12a, the second PAM2 signal having two values of 0-level and 1-level is output from the second NRZ generation circuit 12b, and the third PAM2 signal having two values of 0-level and 4-level is output from the third NRZ generation circuit 12c. That is, the PAM M generation circuit 42 can output voltages corresponding to 0-level, 1-level, 2-level, 3-level, 4-level, 5-level, 6-level, and 7-level to the selector 43. For example, as illustrated in FIG. 11D, since maximum voltage levels of the PAM8 signal having eight values of 0-level, 1-level, 2-level, 3-level, 4-level, 5-level, 6-level, and 7-level generated by the PAM8 pseudo-random pattern generation circuit 418 of the PAM N generation circuit 41 and the PAM2 signal having two values of 0-level and 7-level generated by the PAM M generation circuit 42 are equal to each other, it is not necessary to adjust a voltage of each signal when the selector 43 switches between these signals. The output signal from the PAM M generation circuit 42 is not limited to the PAM2 signal of which the maximum voltage level corresponds to 7-level, and may be, for example, any one of the PAM2 signal, the PAM3 signal, the PAM4 signal, the PAM5 signal, the PAM6 signal, the PAM7 signal, and the PAM8 signal of which the maximum voltage level corresponds to 7-level or less than 7-level.

A state 7 is a state in which the first switch SW1, the second switch SW2, and the third switch SW3 are all turned OFF. That is, since only a voltage corresponding to 0-level is output from the PAM M generation circuit 42 to the selector 43, this state 7 is not used in the present embodiment.

A state 8 is a state in which only the second switch SW2 is turned ON and the first switch SW1 and the third switch SW3 are turned OFF. At this time, since the second PAM2 signal having two values of 0-level and 1-level is only output from the second NRZ generation circuit 12b, this state 8 is not used in the present embodiment.

Figure 12:
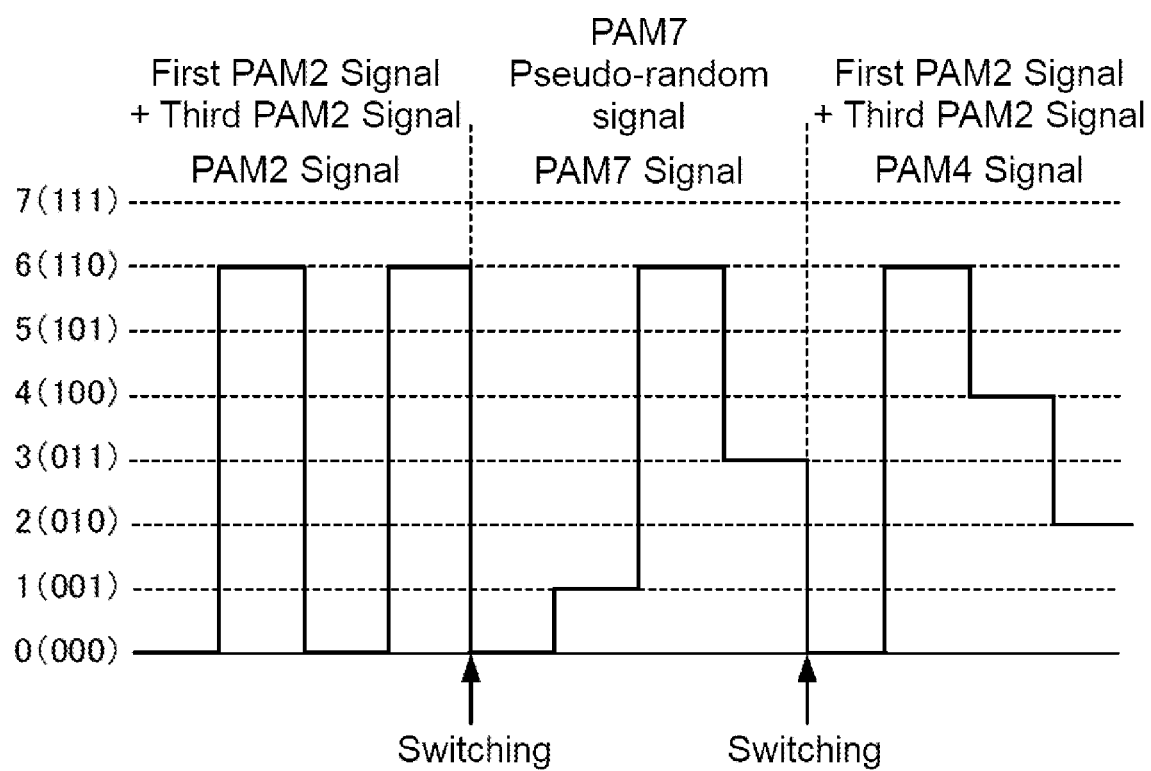
FIG. 12 is a diagram illustrating an output example in which the PAM2 signal is switched to the PAM7 signal and then switched to the PAM4 signal in the state 5.

FIG. 12 illustrates an example in which the PAM2 signal generated by the PAM M generation circuit 42 is switched to the PAM7 signal generated by the PAM7 pseudo-random pattern generation circuit 417, and then is switched to the PAM4 signal generated by the PAM M generation circuit 42, for the state 5. As described above, the signal generation apparatus 40 of the present embodiment can switch between the PAM2 signal and the PAM7 signal, and switch between the PAM4 signal and the PAM7 signal while maintaining the maximum voltage level at the voltage level corresponding to 6-level. In the same manner, the signal generation apparatus 40 of the present embodiment also can switch between the PAM2 signal and the PAM6 signal, and switch between the PAM4 signal and the PAM6 signal while maintaining the maximum voltage level at the voltage level corresponding to 5-level in the state 4.

Figure 13:
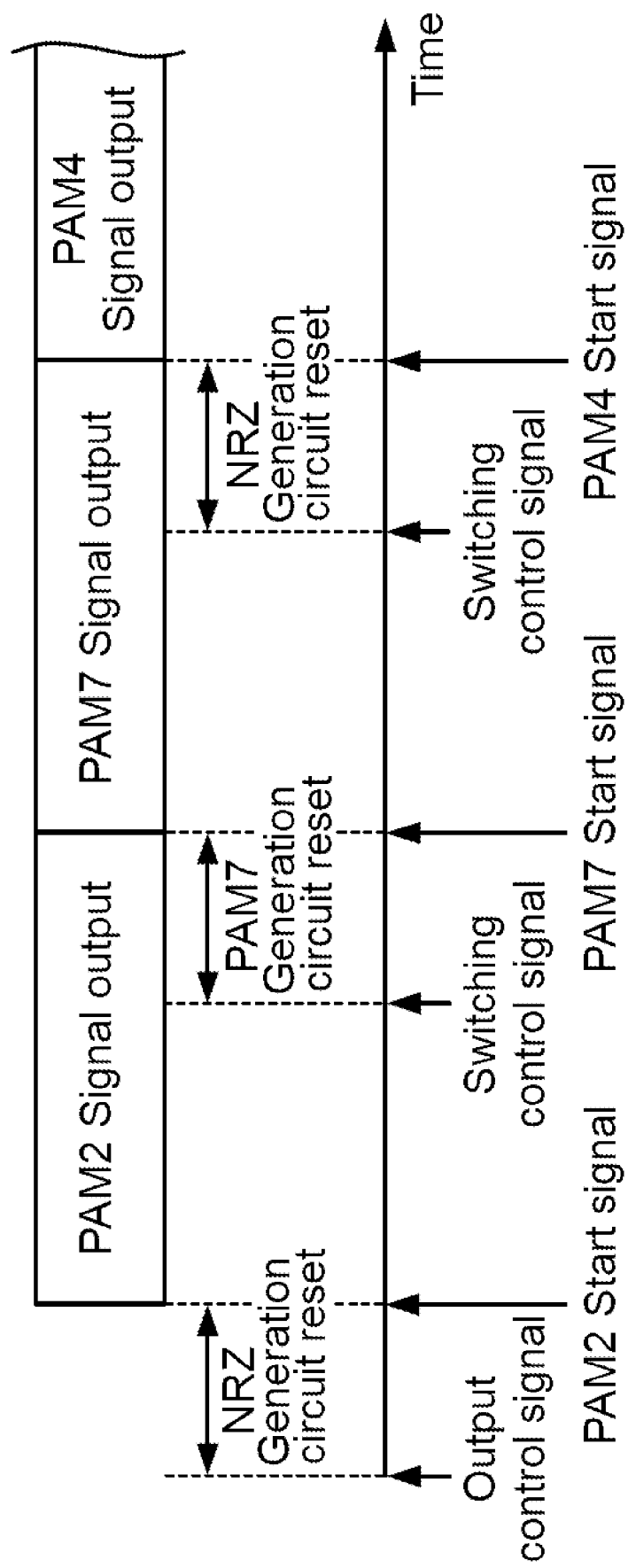
FIG. 13 is a diagram for explaining an output timing of the PAM2 signal, the PAM7 signal, and the PAM4 signal in the state 5.

FIG. 13 is a diagram illustrating an example of an output timing of the PAM2 signal, the PAM7 signal, and the PAM4 signal in the state 5. First, the control unit 19 outputs an output control signal for outputting the PAM2 signal of which the maximum voltage level corresponds to 6-level to the PAM M generation circuit 42. Accordingly, the first NRZ generation circuit 12a starts outputting the first PAM2 signal after completing an initialization process and a generation process of the first PAM2 signal. At the same time, the third NRZ generation circuit 12c starts outputting the third PAM2 signal after completing an initialization process and a generation process of the third PAM2 signal.

In the initialization process, a process of giving a predetermined initial value to the first NRZ generation circuit 12a and the third NRZ generation circuit 12c is performed so that the PAM2 signal output from the PAM M generation circuit 42 always starts with the identical data each time the initialization process is performed. In addition, in the generation process, the PAM M generation circuit 42 generates the PAM2 signal having a pseudo-random pattern based on the initial value set in the initialization process. Further, the PAM M generation circuit 42 outputs the generated PAM2 signal and a PAM2 start signal synchronized with a head position of the PAM2 signal. The selector 43 outputs the PAM2 signal together with the PAM2 start signal, by using the input of the PAM2 start signal as a trigger.

Next, when a switching control signal for switching the output signal from the selector 43 from the PAM2 signal to the PAM7 signal is output from the control unit 19, the PAM7 pseudo-random pattern generation circuit 417 starts an initialization process and a generation process of the PAM7 signal by using the input of the switching control signal as a trigger. In the initialization process, a process of giving a predetermined initial value to the PAM7 pseudo-random pattern generation circuit 417 is performed so that the PAM7 signal output from the PAM7 pseudo-random pattern generation circuit 417 always starts with the identical data each time the initialization process is performed. In addition, in the generation process, the PAM7 pseudo-random pattern generation circuit 417 generates the PAM7 signal having a pseudo-random pattern based on the initial value set in the initialization process. Further, the PAM7 pseudo-random pattern generation circuit 417 outputs the generated PAM7 signal and a PAM7 start signal synchronized with a head position of the PAM7 signal. The selector 43 continues to output the PAM2 signal until the PAM7 start signal is input together with the PAM7 signal from the PAM7 pseudo-random pattern generation circuit 417, and outputs the PAM7 signal together with the PAM7 start signal instead of the PAM2 signal, by using the input of the PAM7 start signal as a trigger.

Next, the control unit 19 outputs a switching control signal for switching the output signal from the selector 43 from the PAM7 signal to the PAM4 signal, to the PAM M generation circuit 42. Accordingly, the first NRZ generation circuit 12a starts outputting the first PAM2 signal after completing the initialization process and the generation process of the first PAM2 signal already described, by using the input of the switching control signal as a trigger. At the same time, the third NRZ generation circuit 12c starts outputting the third PAM2 signal after completing an initialization process and a generation process of the third PAM2 signal. Further, the PAM M generation circuit 42 outputs the generated PAM4 signal and a PAM4 start signal synchronized with a head position of the PAM4 signal. The selector 43 continues to output the PAM7 signal until the PAM4 start signal is input together with the PAM4 signal from the PAM M generation circuit 42, and outputs the PAM4 signal together with the PAM4 start signal instead of the PAM7 signal, by using the input of the PAM4 start signal as a trigger.

In this manner, the signal generation apparatus 40 according to the present embodiment can perform mutual switching between the PAM M signal and the PAM N signal without a signal output stop section occurring when the output signal is switched by the selector 43.

Figure 14:
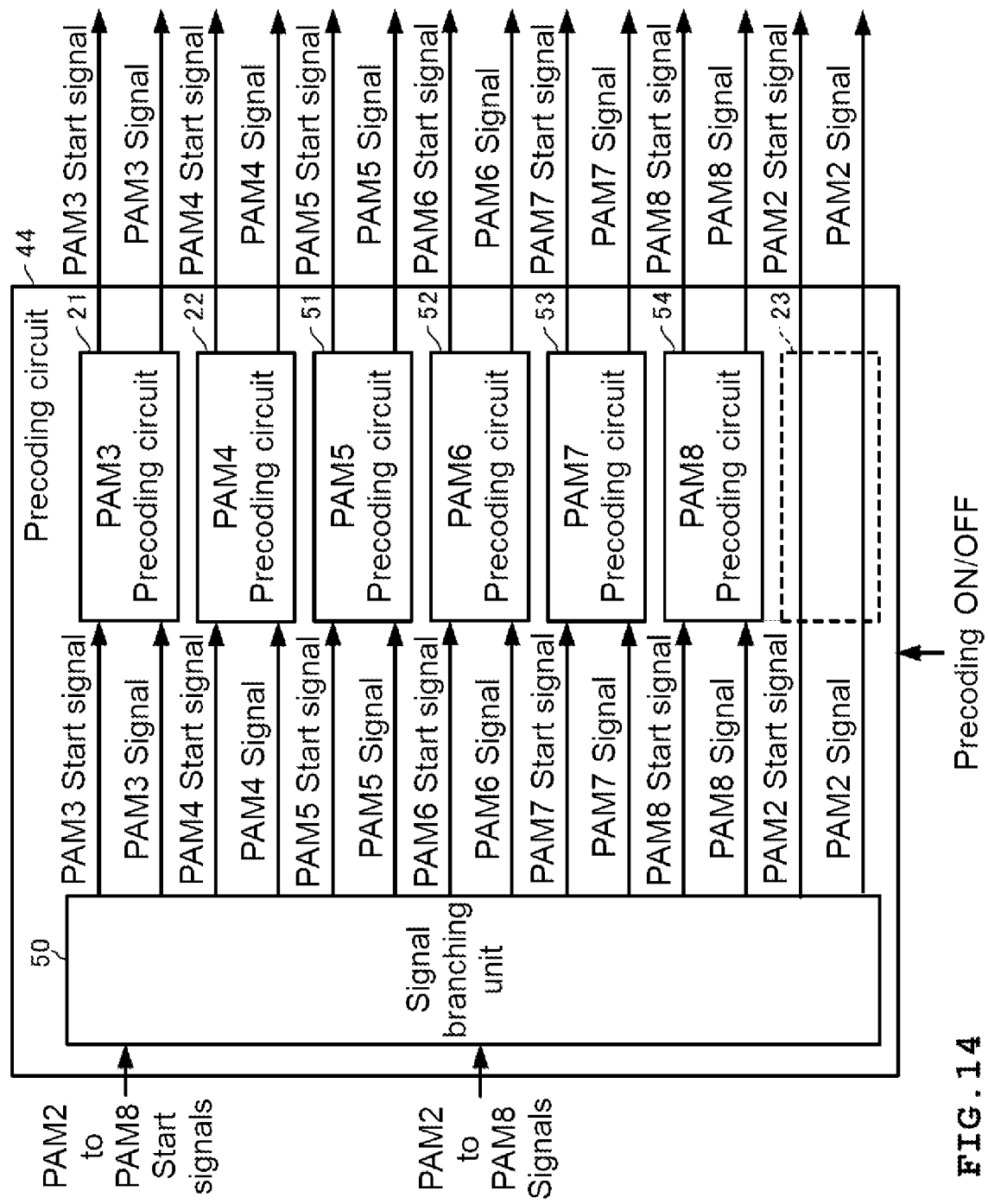
FIG. 14 is a block diagram illustrating a configuration of a precoding circuit in FIG. 7.

As illustrated in FIG. 14, the precoding circuit 44 included in the signal generation apparatus 40 according to the present embodiment performs precoding on symbols constituting the PAM N signal or the PAM M signal input from the selector 43, by using the input of the PAM N start signal or the PAM M start signal as a trigger. Specifically, the precoding circuit 44 includes a signal branching unit 50, the PAM3 precoding circuit 21, the PAM4 precoding circuit 22, a PAM5 precoding circuit 51, a PAM6 precoding circuit 52, a PAM7 precoding circuit 53, a PAM8 precoding circuit 54, and the through circuit 23. Operations of the PAM3 precoding circuit 21, the PAM4 precoding circuit 22, and the through circuit 23 have the same manner as those in the first embodiment.

The signal branching unit 50 inputs a PAM3 start signal and a PAM3 signal output from the selector 43, to the PAM3 precoding circuit 21. In addition, the signal branching unit 50 inputs a PAM4 start signal and a PAM4 signal output from the selector 43, to the PAM4 precoding circuit 22. In addition, the signal branching unit 50 inputs a PAM5 start signal and a PAM5 signal output from the selector 43, to the PAM5 precoding circuit 51. In addition, the signal branching unit 50 inputs a PAM6 start signal and a PAM6 signal output from the selector 43, to the PAM6 precoding circuit 52. In addition, the signal branching unit 50 inputs a PAM7 start signal and a PAM7 signal output from the selector 43, to the PAM7 precoding circuit 53. In addition, the signal branching unit 50 inputs a PAM8 start signal and a PAM8 signal output from the selector 43, to the PAM8 precoding circuit 54. Further, the signal branching unit 50 inputs a PAM2 start signal and a PAM2 signal output from the selector 43, to the through circuit 23.

In a case where the precoding process on the PAM5 signal is set to ON by an operation input to the operation unit 18 by the user in advance, the PAM5 precoding circuit 51 performs precoding on symbols constituting the PAM5 signal input from the signal branching unit 50 by using the input of the PAM5 start signal from the signal branching unit 50 as a trigger. Further, the PAM5 precoding circuit 51 outputs the PAM5 start signal and the PAM5 signal after precoding, to the error insertion circuit 45 in the subsequent stage. On the other hand, in a case where the precoding process on the PAM5 signal is set to OFF by an operation input to the operation unit 18 by the user in advance, the PAM5 precoding circuit 51 outputs the PAM5 start signal and the PAM5 signal as they are, to the error insertion circuit 45 by using the input of the PAM5 start signal from the signal branching unit 50 as a trigger.

In a case where the precoding process on the PAM6 signal is set to ON by an operation input to the operation unit 18 by the user in advance, the PAM6 precoding circuit 52 performs precoding on symbols constituting the PAM6 signal input from the signal branching unit 50 by using the input of the PAM6 start signal from the signal branching unit 50 as a trigger. Further, the PAM6 precoding circuit 52 outputs the PAM6 start signal and the PAM6 signal after precoding, to the error insertion circuit 45 in the subsequent stage. On the other hand, in a case where the precoding process on the PAM6 signal is set to OFF by an operation input to the operation unit 18 by the user in advance, the PAM6 precoding circuit 52 outputs the PAM6 start signal and the PAM6 signal as they are, to the error insertion circuit 45 by using the input of the PAM6 start signal from the signal branching unit 50 as a trigger.

In a case where the precoding process on the PAM7 signal is set to ON by an operation input to the operation unit 18 by the user in advance, the PAM7 precoding circuit 53 performs precoding on symbols constituting the PAM7 signal input from the signal branching unit 50 by using the input of the PAM7 start signal from the signal branching unit 50 as a trigger. Further, the PAM7 precoding circuit 53 outputs the PAM7 start signal and the PAM7 signal after precoding, to the error insertion circuit 45 in the subsequent stage. On the other hand, in a case where the precoding process on the PAM7 signal is set to OFF by an operation input to the operation unit 18 by the user in advance, the PAM7 precoding circuit 53 outputs the PAM7 start signal and the PAM7 signal as they are, to the error insertion circuit 45 by using the input of the PAM7 start signal from the signal branching unit 50 as a trigger.

In a case where the precoding process on the PAM8 signal is set to ON by an operation input to the operation unit 18 by the user in advance, the PAM8 precoding circuit 54 performs precoding on symbols constituting the PAM8 signal input from the signal branching unit 50 by using the input of the PAM8 start signal from the signal branching unit 50 as a trigger. Further, the PAM8 precoding circuit 54 outputs the PAM8 start signal and the PAM8 signal after precoding, to the error insertion circuit 45 in the subsequent stage. On the other hand, in a case where the precoding process on the PAM8 signal is set to OFF by an operation input to the operation unit 18 by the user in advance, the PAM8 precoding circuit 54 outputs the PAM8 start signal and the PAM8 signal as they are, to the error insertion circuit 45 by using the input of the PAM8 start signal from the signal branching unit 50 as a trigger.

In this manner, by using the PAM N start signal or the PAM M start signal as a trigger, the precoding circuit 44 according to the present embodiment can start the precoding process from heads of those signals, at the same time that the PAM N signal or the PAM M signal is input.

Therefore, in a case where the error insertion process on the PAM N signal or the PAM M signal is set to ON by an operation input to the operation unit 18 by the user in advance, the error insertion circuit 45 inserts an error into symbols constituting the PAM N signal or the PAM M signal input from the precoding circuit 44 by using the input of the PAM N start signal or the PAM M start signal from the precoding circuit 44 as a trigger. Further, the error insertion circuit 45 outputs the PAM N signal or the PAM M signal after the error insertion. On the other hand, in a case where the error insertion process on the PAM N signal or the PAM M signal is set to OFF by an operation input to the operation unit 18 by the user in advance, the error insertion circuit 45 outputs the PAM N signal or the PAM M signal as it is, by using the input of the PAM N start signal or the PAM M start signal from the precoding circuit 44 as a trigger.

In this manner, by using the PAM N start signal and the PAM M start signal as a trigger, the error insertion circuit 45 according to the present embodiment can start the error insertion process from heads of those signals, at the same time that the PAM N signal or the PAM M signal is input.

Hereinafter, an example of a process of a signal generation method using the signal generation apparatus 40 according to the present embodiment will be described with reference to the flowcharts in FIGS. 15 and 16. In the flowchart in FIGS. 15 and 16, a process of switching an output signal from the selector 43 from a PAM2 signal to a PAM4 signal via a PAM7 signal will be described.

Figure 15:
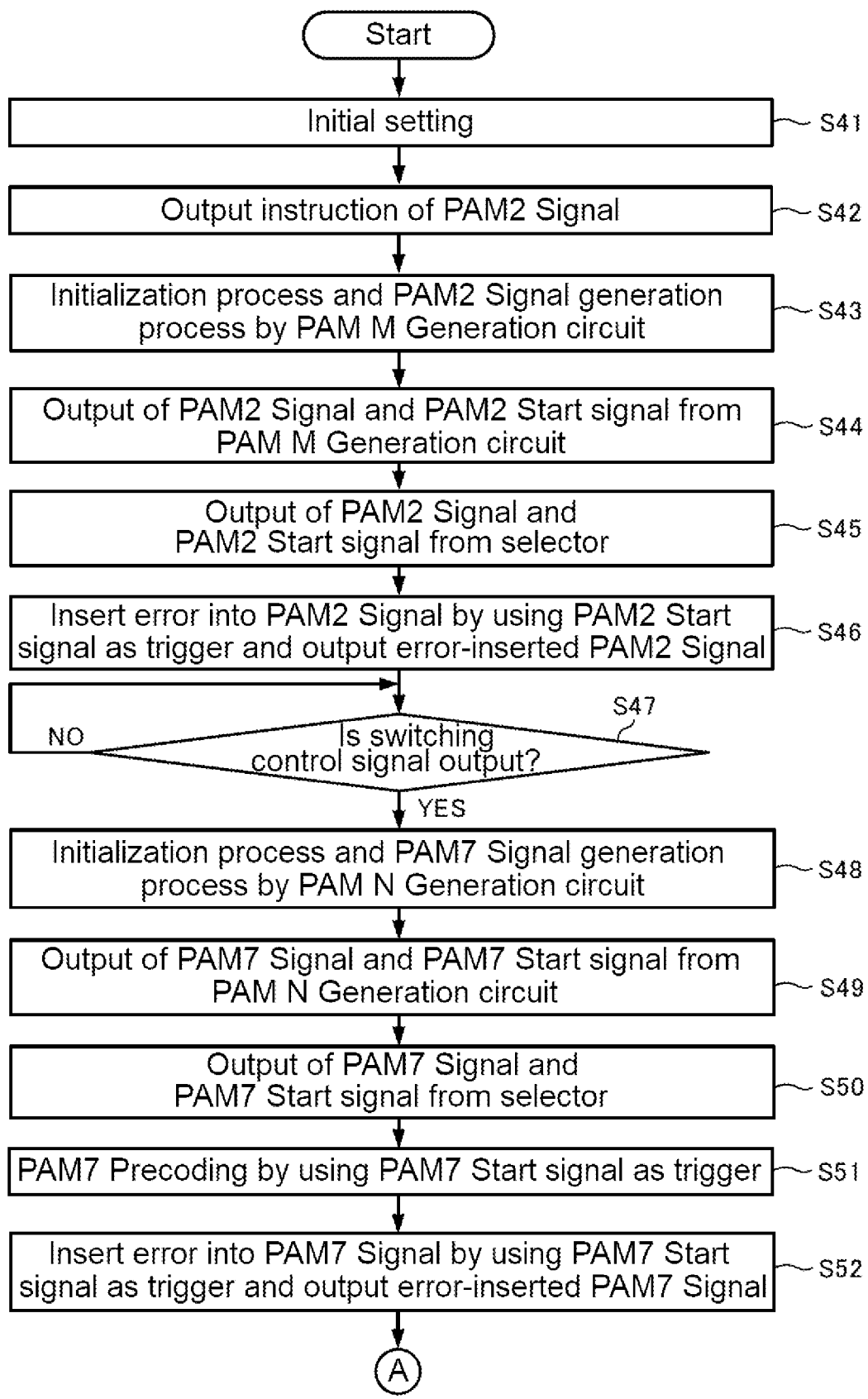
FIG. 15 is a flowchart (part 1) illustrating a process of a signal generation method using the signal generation apparatus according to the second embodiment of the present invention.
Figure 16:
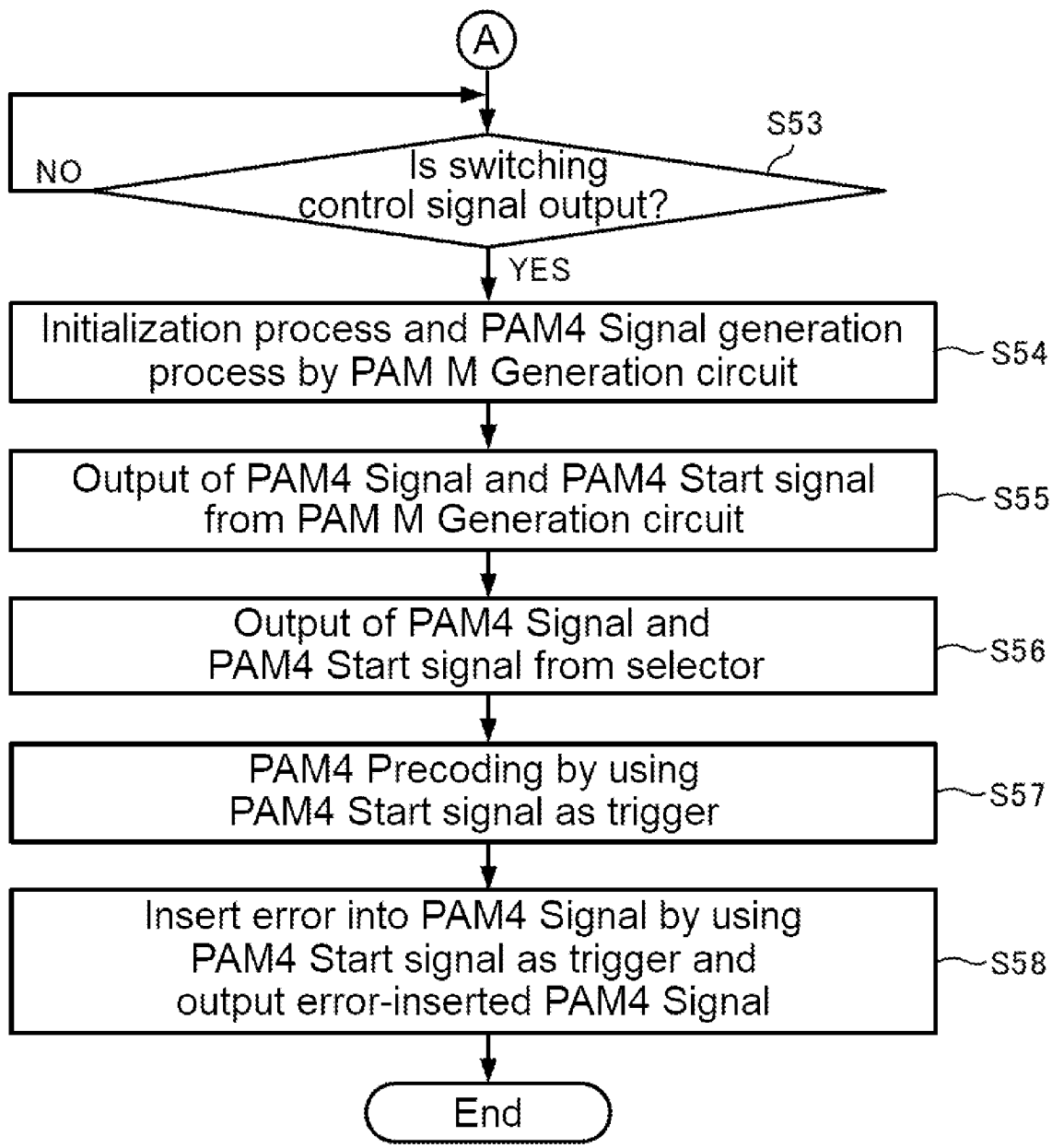
FIG. 16 is a flowchart (part 2) illustrating the process of the signal generation method using the signal generation apparatus according to the second embodiment of the present invention.

As illustrated in FIG. 15, first, by an operation input to an operation unit 18 by the user, the control unit 19 performs an initial setting such as a setting of the number of stages of the generation polynomial in each circuit of the PAM N generation circuit 41 and the PAM M generation circuit 42 or an ON or OFF setting of the first switch SW1, the second switch SW2, the third switch SW3, the precoding circuit 44, and the error insertion circuit 45 (step S41).

Next, the control unit 19 outputs an output control signal of the PAM 2 signal to the PAM M generation circuit 42 in response to an operation input to the operation unit 18 by the user (step S42).

Next, the PAM M generation circuit 42 performs an initialization process and a generation process of the PAM2 signal in which the maximum voltage level corresponds to 6-level, based on the initial setting in step S41 (step S43).

Next, the PAM M generation circuit 42 outputs the generated PAM2 signal and a PAM2 start signal synchronized with a head position of the PAM2 signal to the selector 43 (step S44).

Next, the selector 43 outputs the PAM2 signal together with the PAM2 start signal to the error insertion circuit 45 via the through circuit 23 of the precoding circuit 44, by using the input of the PAM2 start signal as a trigger (step S45).

Next, in a case where the ON setting of the error insertion process is performed on the PAM2 signal in advance in step S41, the error insertion circuit 45 uses the input of the PAM2 start signal as a trigger to insert an error into the symbols constituting the PAM2 signal input from the precoding circuit 44 and outputs the error-inserted PAM2 signal (step S46).

Next, the control unit 19 determines whether or not there is an instruction to output a switching control signal for switching the output signal from the selector 43 from the PAM2 signal to the PAM7 signal by an operation input to the operation unit 18 by the user. In a case where there is the instruction to output the switching control signal, the control unit 19 outputs the switching control signal to the PAM7 pseudo-random pattern generation circuit 417 of the PAM N generation circuit 41 and the selector 43 (switching control step S47).

Next, the PAM7 pseudo-random pattern generation circuit 417 performs an initialization process and a generation process of the PAM7 signal by using the input of the switching control signal as a trigger, based on the initial settings in step S41 (step S48).

Next, the PAM7 pseudo-random pattern generation circuit 417 outputs the generated PAM7 signal and a PAM7 start signal synchronized with a head position of the PAM7 signal to the selector 43 (step S49).

Next, the selector 43 outputs the PAM7 signal together with the PAM7 start signal instead of the PAM2 signal to the precoding circuit 44, by using the input of the PAM7 start signal as a trigger (step S50).

Next, in a case where the ON setting of the precoding process is performed on the PAM7 signal in advance in step S41, the PAM7 precoding circuit 53 of the precoding circuit 44 uses the input of the PAM7 start signal as a trigger to perform precoding on symbols constituting the PAM7 signal input from the selector 43 (step S51).

Next, in a case where the ON setting of the error insertion process is performed on the PAM7 signal in advance in step S41, the error insertion circuit 45 uses the input of the PAM7 start signal as a trigger to insert an error into the symbols constituting the PAM7 signal input from the PAM7 precoding circuit 53 and outputs the error-inserted PAM7 signal (step S52).

Next, the control unit 19 determines whether or not there is an instruction to output a switching control signal for switching the output signal from the selector 43 from the PAM7 signal to the PAM4 signal by an operation input to the operation unit 18 by the user. In a case where there is the instruction to output the switching control signal, the control unit 19 outputs the switching control signal to the PAM M generation circuit 42 and the selector 43 (switching control step S53).

Next, the PAM M generation circuit 42 performs an initialization process and a generation process of the PAM4 signal in which the maximum voltage level corresponds to 6-level by using the input of the switching control signal as a trigger, based on the initial setting in step S41 (step S54).

Next, the PAM M generation circuit 42 outputs the generated PAM4 signal and a PAM4 start signal synchronized with a head position of the PAM4 signal to the selector 43 (step S55).

Next, the selector 43 outputs the PAM4 signal together with the PAM4 start signal instead of the PAM7 signal to the precoding circuit 44, by using the input of the PAM4 start signal as a trigger (step S56).

Next, in a case where the ON setting of the precoding process is performed on the PAM4 signal in advance in step S41, the PAM4 precoding circuit 22 of the precoding circuit 44 uses the input of the PAM4 start signal as a trigger to perform precoding on symbols constituting the PAM4 signal input from the selector 43 (step S57).

Next, in a case where the ON setting of the error insertion process is performed on the PAM4 signal in advance in step S41, the error insertion circuit 45 uses the input of the PAM4 start signal as a trigger to insert an error into the symbols constituting the PAM4 signal input from the PAM4 precoding circuit 22 and outputs the error-inserted PAM4 signal (step S58).

In the above process, steps S48 and S49 constitute the PAM N generation step. Steps S43, S44, S54, and S55 constitute the PAM M generation step. Steps S45, S50, and S56 constitute the signal switching step. The PRTS generation step of the first embodiment constitutes the PAM N generation step. Further, the first NRZ generation step of the first embodiment constitutes the PAM M generation step.

As described above, the signal generation apparatus 40 according to the present embodiment is configured so that the maximum voltage levels of the PAM N signal output from the PAM N generation circuit 41 and the PAM M signal output from the PAM M generation circuit 42 are set to be equal, so that it is not necessary to adjust the voltage when the selector 43 switches between the PAM N signal and the PAM M signal. Therefore, the signal generation apparatus according to the present embodiment can perform mutual switching between the PAM N signal and the PAM M signal without generating a noise or an overvoltage due to a slow processing speed of the CPU as compared with the FPGA.

In addition, when the output signal is switched from the PAM N signal to the PAM M signal, the selector 43 included in the signal generation apparatus 40 according to the present embodiment continues to output the PAM N signal until the PAM M start signal synchronized with the head position of the PAM M signal is input together with the PAM M signal, and outputs the PAM M signal instead of the PAM N signal by using the input of the PAM M start signal as a trigger. That is, the signal generation apparatus 40 according to the present embodiment also continues to output the PAM N signal during a time from a generation start to a generation completion of the PAM M signal, so that the output signal can be switched from the PAM N signal to the PAM M signal without generating a signal output stop section.

In addition, when the output signal is switched from the PAM M signal to the PAM N signal, the selector 43 included in the signal generation apparatus 40 according to the present embodiment continues to output the PAM M signal until the PAM N start signal synchronized with the head position of the PAM N signal is input together with the PAM N signal, and outputs the PAM N signal instead of the PAM M signal by using the input of the PAM N start signal as a trigger. That is, the signal generation apparatus 40 according to the present embodiment also continues to output the PAM M signal during a time from a generation start to a generation completion of the PAM N signal, so that the output signal can be switched from the PAM M signal to the PAM N signal without generating a signal output stop section.

In addition, the signal generation apparatus 40 according to the present embodiment can start the precoding process on the head of the PAM N signal or the PAM M signal, at the same time that the PAM N signal or the PAM M signal is input to the precoding circuit 44, by using the PAM N start signal or the PAM M start signal synchronized with the head position of the PAM N signal or the PAM M signal as a trigger.

Further, the signal generation apparatus 40 according to the present embodiment can start the error insertion process on the head of the PAM N signal or the PAM M signal, at the same time that the PAM N signal or the PAM M signal is input to the error insertion circuit 45, by using the PAM N start signal or the PAM M start signal synchronized with the head position of the PAM N signal or the PAM M signal as a trigger.

In addition, since the signal generation apparatus 40 according to the present embodiment includes the first NRZ generation circuit 12a, the second NRZ generation circuit 12b, and the third NRZ generation circuit 12c, any one of the PAM2 signal, the PAM3 signal, the PAM4 signal, the PAM5 signal, the PAM6 signal, the PAM7 signal, and the PAM8 signal can be generated as the PAM M signal.

Further, the signal generation apparatus 40 according to the present embodiment can switch the processing contents of the precoding circuit 44 and the error insertion circuit 45 according to types of the signals (PAM2 to PAM8), with the start signals flowing together with the signals generated by the PAM N generation circuit 41 and the PAM M generation circuit 42.

DESCRIPTION OF REFERENCE NUMERALS AND SIGNS 10, 40 signal generation apparatus
11 PRTS generation circuit
12a first NRZ generation circuit
12b second NRZ generation circuit
12c third NRZ generation circuit
13 switch
14 adder
14a first adder
14b second adder
15, 43 selector
16, 44 precoding circuit
17, 45 error insertion circuit
18 operation unit
19 control unit
20, 50 signal branching unit
21 PAM3 precoding circuit
22 PAM4 precoding circuit 23 through circuit
41 PAM N generation circuit
42 PAM M generation circuit
51 PAM5 precoding circuit
52 PAM6 precoding circuit
53 PAM7 precoding circuit
54 PAM8 precoding circuit
414 PAM4 pseudo-random pattern generation circuit
415 PAM5 pseudo-random pattern generation circuit
416 PAM6 pseudo-random pattern generation circuit
417 PAM7 pseudo-random pattern generation circuit
418 PAM8 pseudo-random pattern generation circuit
419 selector
SW1 first switch
SW2 second switch
SW3 third switch

The invention claimed is:

1. A signal generation apparatus comprising:
a pulse amplitude modulation N (PAM N) generation circuit configured to generate a PAM N signal of n values;
a pulse amplitude modulation M (PAM M) generation circuit configured to generate a PAM M signal of m values (m<n) having a maximum voltage level equal to a maximum voltage level of the PAM N signal generated by the PAM N generation circuit;
a signal switching unit configured to output any one of the PAM N signal generated by the PAM N generation circuit and the PAM M signal generated by the PAM M generation circuit; and
a control unit configured to output a switching control signal for switching an output signal from the signal switching unit from the PAM N signal to the PAM M signal,
wherein after generating the PAM M signal by using an input of the switching control signal as a trigger, the PAM M generation circuit is configured to output the generated PAM M signal and a PAM M start signal synchronized with a head position of the PAM M signal, and
the signal switching unit is configured to continue to output the PAM N signal until the PAM M start signal is input together with the PAM M signal, and to output the PAM M signal instead of the PAM N signal by using an input of the PAM M start signal as a trigger.

2. A signal generation apparatus comprising:
a pulse amplitude modulation N (PAM N) generation circuit that generates a PAM N signal of n values;
a pulse amplitude modulation M (PAM M) generation circuit that generates a PAM M signal of m values (m<n) having a maximum voltage level equal to a maximum voltage level of the PAM N signal generated by the PAM N generation circuit;
a signal switching unit that outputs any one of the PAM N signal generated by the PAM N generation circuit and the PAM M signal generated by the PAM M generation circuit; and
a control unit configured to output a switching control signal for switching an output signal from the signal switching unit from the PAM M signal to the PAM N signal,
wherein after generating the PAM N signal by using an input of the switching control signal as a trigger, the PAM N generation circuit is configured to output the generated PAM N signal and a PAM N start signal synchronized with a head position of the PAM N signal, and the signal switching unit is configured to continue to output the PAM M signal until the PAM N start signal is input together with the PAM N signal, and to output the PAM N signal instead of the PAM M signal by using an input of the PAM N start signal as a trigger.

3. The signal generation apparatus according to claim 2, further comprising:
a precoding circuit that performs precoding on a symbol constituting the PAM N signal or the PAM M signal input from the signal switching unit by using an input of the PAM N start signal or the PAM M start signal as a trigger.

4. The signal generation apparatus according to claim 3, further comprising:
an error insertion circuit that inserts an error into the symbol constituting the PAM N signal or the PAM M signal input from the precoding circuit by using an input of the PAM N start signal or the PAM M start signal as a trigger.

5. The signal generation apparatus according to claim 4, wherein the PAM M generation circuit includes
a first non return to zero (NRZ) generation circuit that generates a first PAM2 signal having two values of 0-level and 2-level,
a second NRZ generation circuit that generates a second PAM2 signal having two values of 0-level and 1-level,
a third NRZ generation circuit that generates a third PAM2 signal having two values of 0-level and 4-level,
a first switch that passes or blocks the first PAM2 signal generated by the first NRZ generation circuit,
a second switch that passes or blocks the second PAM2 signal generated by the second NRZ generation circuit,
a third switch that passes or blocks the third PAM2 signal generated by the third NRZ generation circuit,
a first adder that adds an output signal from the first switch and an output signal from the second switch, and
a second adder that adds an output signal from the first adder and an output signal from the third switch to generate the PAM M signal.

6. A signal generation method comprising:
a pulse amplitude modulation N (PAM N) generation step of generating a PAM N signal of n values;
a pulse amplitude modulation M (PAM M) generation step of generating a PAM M signal of m values (m<n) having a maximum voltage level equal to a maximum voltage level of the PAM N signal generated in the PAM N generation step;
a signal switching step of outputting any one of the PAM N signal generated in the PAM N generation step and the PAM M signal generated in the PAM M generation step; and
a switching control step of outputting a switching control signal for switching an output signal from the signal switching step from the PAM N signal to the PAM M signal,
wherein in the PAM M generation step, after the PAM M signal is generated by using an input of the switching control signal as a trigger, the generated PAM M signal and a PAM M start signal synchronized with a head position of the PAM M signal are output; and
in the signal switching step, the PAM N signal is continuously output until the PAM M start signal is input together with the PAM M signal, and the PAM M signal is output instead of the PAM N signal by using an input of the PAM M start signal as a trigger.

7. A signal generation method comprising:

a pulse amplitude modulation N (PAM N) generation step of generating a PAM N signal of n values;

a pulse amplitude modulation M (PAM M) generation step of generating a PAM M signal of m values (m<n) having a maximum voltage level equal to a maximum voltage level of the PAM N signal generated in the PAM N generation step;

a signal switching step of outputting any one of the PAM N signal generated in the PAM N generation step and the PAM M signal generated in the PAM M generation step; and a switching control step of outputting a switching control signal for switching an output signal from the signal switching step from the PAM M signal to the PAM N signal, wherein in the PAM N generation step, after the PAM N signal is generated by using an input of the switching control signal as a trigger, the generated PAM N signal and a PAM N start signal synchronized with a head position of the PAM N signal are output, and in the signal switching step, the PAM M signal is continuously output until the PAM N start signal is input together with the PAM N signal, and the PAM N signal is output instead of the PAM M signal by using an input of the PAM N start signal as a trigger.

* * * * *